United States Patent

Chaney et al.

Patent Number: 5,926,568
Date of Patent: Jul. 20, 1999

[54] IMAGE OBJECT MATCHING USING CORE ANALYSIS AND DEFORMABLE SHAPE LOCI

[75] Inventors: Edward L. Chaney, Efland; Daniel S. Fritsch; Stephen M. Pizer, both of Chapel Hill; Valen Johnson, Durham, all of N.C.; Alyson G. Wilson, Las Cruces, N.Mex.

[73] Assignees: The University of North Carolina at Chapel Hill, Chapel Hill; Duke University, Durham, both of N.C.

[21] Appl. No.: 08/885,330

[22] Filed: Jun. 30, 1997

Related U.S. Application Data

[51] Int. Cl.[6] ............................. G06K 9/64; G06K 9/68
[52] U.S. Cl. ........................ 382/217; 382/128; 382/203
[58] Field of Search .................................. 382/217, 218, 382/128, 199, 159, 130, 173; 128/922

[56] References Cited

PUBLICATIONS

Blum, H. et al, Shape Description Using Weighted Symmetric Axis Features. *Pattern Recognition,* vol. 10, 167–180 (1978).

Bookstein, F.L., Principal Warps: Thin–Plate Splines and the Decomposition of Deformations. *IEEE Transactions on Pattern Anal. and Machine Intell.,* vol. 11, No. 6, pp. 567–585 (1989).

Chakraborty, A. et al., Deformable Boundary Finding Influenced by Region Homogeneity. *Proc Conf Computer Vision and Pattern Recognition* (CVPR '94), pp. 624–627 (1994).

Cootes, T.F. et al., The Use of Active Shape Models for Locating Structures in Medical Images. *Image and Vision Computing,* vol. 12, No. 6, pp. 355–366 (1994).

Eberly, D. et al., Ridges for Image Analysis. *Journal of Mathematical Imaging and Vision,* 4:351–371 (1994a).

Eberly, D., A Differential Geometric Approach to Anisotropic Diffusion, *Geometry–Driven Diffusion In Computer Vision,* BM ter Haar Romeny (ed.), Kluwer Academic Publishers: pp. 371–392 (1994).

Fritsch, D.S. et al., Segmentation of Medical Image Objects Using Deformable Shape Loci, Inf. Processing in Med. Imaging (IPMI), Lecture Notes in Computer Science, J. Damon & G. Gindi, eds. Springer–Verlag, Berlin: pp. 127–140, (1997).

Fritsch, D.S. et al., Cores for Image Registration, Medical Imaging 1994; Image Processing, M.H. Loew, ed., *SPIE Proceedings* vol. 2167, pp. 128–142 (1994).

Fritsch, D.S., Registration of Radiotherapy Images Using Multiscale Medial Descriptions of Image Structure. Ph.D. dissertation, Department of Biomedical Engineering, University of North Carolina at Chapel Hill (1993).

Fritsch, D.S. et al., Core–Based Portal Image Registration for Automatic Radiotherapy Treatment Verification, *Int. J. Radiat. Oncol. Biol. Phys.,* vol. 33, No. 5, pp. 1287–1300 (1995).

Fritsch, D.S. et al., The multiscale medial axis and its applications in image registration, *NH Elsevier,* Pattern Recognition Letters 15, pp. 445–452, May (1994).

(List continued on next page.)

*Primary Examiner*—Leo H. Boudreau
*Assistant Examiner*—Shawn Cage
*Attorney, Agent, or Firm*—Myers Bigel Sibley & Sajovec, P.A.

[57] ABSTRACT

Methods, systems, and computer program products are provided for automatic image recognition of standard shapes which include a core-based deformable loci skeletal grid used to define and represent an object via a model template. The template includes deformable segments, the changes of which are measurable against the deformed model corresponding to an object in a subsequent image. Statistical correlation techniques optimize the match to further refine the shape of the subsequent image.

31 Claims, 19 Drawing Sheets

Boundary-boundary links (bold),
boundary-medial (o) links (heavier),
medial-medial links (grey),
and interfigural links (dashed)

OTHER PUBLICATIONS

Johnson et al., Analysis and Reconstruction of Medical Images Using Prior Information, with Discussion, *Case Studies in Applied Bayesian Statistics II*, pp. 149–238 (Springer–Verlag, 1995).

Kass, M et al., Snakes: Active Contour Models. *Int. J. Comp. Vision* 1, pp. 321–331 (1988).

Leymarie, F. et al., Tracking Deformable Objects in the Plane Using an Active Contour Model. *IEEE Trans. PAMI*, vol. 15, No. 6, pp. 617–634 (1993).

Lindeberg, T.: Scale–Space Theory in Computer Vision, Kluwer Academic Publishers, Boston, pp. 149–162 (1994).

Morse, Bryan S. et al., General shape and specific detail: Context–dependent use of scale in determining visual form; Proc. 2nd Int'l Workshop on Visual Form: 374–383, World Scientific, Singapore (1994).

Pizer, Stephen M. et al., Object Shape before Boundary Shape: Scale–space Medial Axes, Presented at Shape in Picture (NATO Advanced Research Workshop), Journal of Mathematical Imaging and Vision, 4:303–313 (1994).

Pizer, Stephen M. et al., Human Perception and Computer Image Analysis of Objects in Images, Proc. Conf. of the Australia Pattern Recognition Society (DICTA), I:19–26 (1993).

Morse, Bryan S. et al., Multiscale medial analysis of medical images, Image and Vision Computing, vol. 12, No. 6, 327–338 (Jul./Aug. 1994).

Pizer, Stephen M. et al., Objects, Boundaries, and Medical Image Analysis, University of North Carolina at Chapel Hill, TR94–069.

Pizer, Stephen M. et al., Stimulated Cores and their Applications in Medical Imaging, Infor. Proc. in Med. Imaging, 1–15(1995).

Pizer, Stephen M. et al., 3D Image–Guided Surgery via Registration of Intraoperative and Preoperative Images, Proc. Conf. on Virtual Reality in Surgery and Medicine, Leeds, UK (1995).

Pizer, Stephen M. et al., Core–based boundary claiming, Med. Imaging '94: Image Proc., SPIE 2167:151–159.

Lindeberg, T. et al., Chapter 1: Linear Scale Space I: Basic Theory, and Chapter 2: Linear Scale–Space II: Early Visual Operations, *Geometry–Driven Diffusion in Computer Vision*, Kluwer Academic Publishers, Dordrecht, pp. 1–72 (1994).

McAuliffe, M.J. et al., Scale–Space Boundary Evolution Initialized by Cores, Proceedings of the 4th International Conference on Visualization in Biomedical Computing, Hamburg, IEEE Computer Society Press, Los Alamitos, CA, pp. 173–183(1996).

McInerney, T. et al., Deformable models in medical image analysis: a survey, *Medical Image Analysis*, vol. 1, No. 2, pp. 91–108 (1996).

Morse, B.S. et al., Robust Object Representation Through Object–Relevant Use of Scale. *Information Processing in Medical Imaging*, SFIE 2167, pp. 104–115 (IPMI '94).

Morse, B.S. et al., Zoom–Invariant Vision of Figural Shape: Effects on Cores of Image Disturbances. University of North Carolina Technical Report TR 96–005, pp. 1–36 (1996).

Pizer, S.M. et al., Zoom–Invariant Vision of Figural Shape: The Mathematics of Cores. University of North Carolina Computer Science Technical Report, TRN96–004, 1–43 (1996).

Pizer, S.M. et al., Segmentation, Registration, and Measurement of Shape Variation Via Image Object Shape. University of North Carolina Computer Science Technical Report, TRN96–031, pp. 1–23 (1996).

Vaillant, R. et al., Using Extremal Boundaries for 3–D Object Modeling. *IEEE Transactions on Pattern Analysis and Machine Intelligence* vol. 14, No. 2, pp. 157–173 (1992).

van den Elsen, P.A. et al., Medical Image Matching—A Review with Classification, *IEEE Eng. Med. Biol.*, vol. 12:1, pp. 26–39 (1993).

Wilson, A. et al., Towards a Framework for Automated Image Analysis, eds. K. Mardia, Gill, and Dryden, Leeds University Press, pp. 13–20 (1996).

Balter, J.M. et al., Correlation of projection radiographs in radiation therapy using open curve segments and points, *Med. Phys.*, vol. 19 (2), pp. 329–334 (1992).

Balter, J.M., Registration of radiographs in radiation therapy using open curve segments: Method and applications, Doctoral dissertation, University of Chicago, pp. 1–144 (1992).

Hu, M., Visual Pattern Recognition by Moment Invariants, *IRE Trans. Info. Theory*, vol. 8, No. 2, pp. 179–187 (1962).

Borgefors, G., An Improved Version of the Chamfer Matching Algorithm, *Proc. 7th Inf. Conf. Pattern Recognition*, pp. 1175–1177 (1984).

Borgefors, G., Hierarchical Chamber Matching: A Parametric Edge Matching Algorithm, *IEEE Trans PAMI*, vol. 10, No. 6, pp. 849–865 (1988).

Gilhuijs, K.G.A. et al., Automatic on–line inspection of patient setup in radiation therapy using digital portal images, *Med. Phys.*, vol. 20, No. 3, pp. 667–677 (1993.

Press, W.H. et al., Numerical Recipes: The Art of Scientific Computing, *Cambridge University Press*, Cambridge, MA, pp. 635–642 (1986).

Boyer, A.L et al., A review of electronic portal imaging devices (EPIDs), *Med. Phys.*, vol. 19 (1), pp. 1–16 (1992).

Sherouse, G.W. et al., The Portable Virtual–Simulator, *Int. J. Radiation Oncology Biol. Phys.*, vol. 21, pp. 475–482 (1991).

Sherouse, G.W. et al., Computation of Digitally Reconstructed Radiographs for Use in Radiotherapy Treatment Design, *Int. J. Radiat. Oncol. Biol. Phys*, vol. 18, pp. 651–658 (1990).

Liu, A., et al., Volume registration using the 3D core, Proceedings of Visualization in Biomedical Computing, SPIE Proc. vol. 2359, pp. 217–226 (1994).

Blum, H., A New Model Of Global Brain Function. *Perspectives in Biology & Medicine*, 10, pp. 381–407, 1967.

Bookstein, F.L., Morphometric Tools for Landmark Data, Geometry and Biology, *Cambridge University Press*, pp. 55–87 (1991).

Burbeck, C.A. et al., Object Representation by Cores: Identifying and Representing Primitive Spatial Regions. *Vision Research*, vol. 35, No. 13, pp. 1917–1930 (1995).

Burbeck, C.A. et al., Linking Object Boundaries at Scale: a Common Mechanism for Size and Shape Judgements. *Vision Research*, vol. 36, No. 3, pp. 361–372 (1996).

Frome, F.S., A Psychophysical Study of Shape Alignment, Technical Report TR–198, Computer Science Center, University of Maryland, pp. 1a–42 (1972).

Psotka, J., Perceptual Processes That May Create Stick Figures and Balance, *Journal of Experimental Psychology: Human Perception and Performance*, vol. 4, No. 1, pp. 101–111 (1978).

Staib, L.H. et al., Model–Based Deformable Surface Finding for Medical Images, *IEEE Trans. Med. Imag.,* vol. 15, No. 5, pp. 720–731 (1996).

Szekely, G. et al., Segmentation of 2–D and 3–D objects from MRI volume data using constrained elastic deformation of flexible Fourier contour and surface models, *Medical Image Analysis,* vol. 1, No. 1, pp. 19–34, *Oxford University Press* (1996).

Montagnat, J. et al., Volumetric Medical Images Segmentation Using Shape Constrained Deformable Models, Lecture Notes in Comp. Sci.#1205, J. Trocca et al. (eds), Proc CVRMED–MRCAS '97, Springer, pp. 13–22 (1997).

McInerney, T. et al., Medical Image Segmentation Using Topologically Adaptable Surfaces, Lecture Notes in Comp. Sci. #1205, J. Trocca, et al. Proc. CVRMED–MRCAS '97, Springer, pp. 23–32 (1997).

Jones, T.N. et al, Segmentation Using Models with Affinity–Based Localization, Lecture Notes in Comp. Sci. #1205, J. Troccca et al. (eds), Proc CVRMED–MRCAS '97, Springer, pp. 53–62 (1997).

Vehkomaki, T. et al., A User–guided Tool for Efficient Segmentation of Medical Image Data, Lecture Notes in Comp. Sci. #1205, J. Trocca, et al. Proc. CVRMED–MRCAS '97, Springer, pp. 685–694 (1997).

A planning image

A corresponding treatment image

Boundary-boundary links (bold),
boundary-medial (o) links (heavier),
medial-medial links (grey),
and interfigural links (dashed)

An object shape template
for a teardrop figure
with a protrusion subfigure

- • Medial site
- ○ Boundary site

•——• Medial-medial link
•········○ Medial-boundary link
○········○ Boundary-boundary link
•——• Figure-figure link

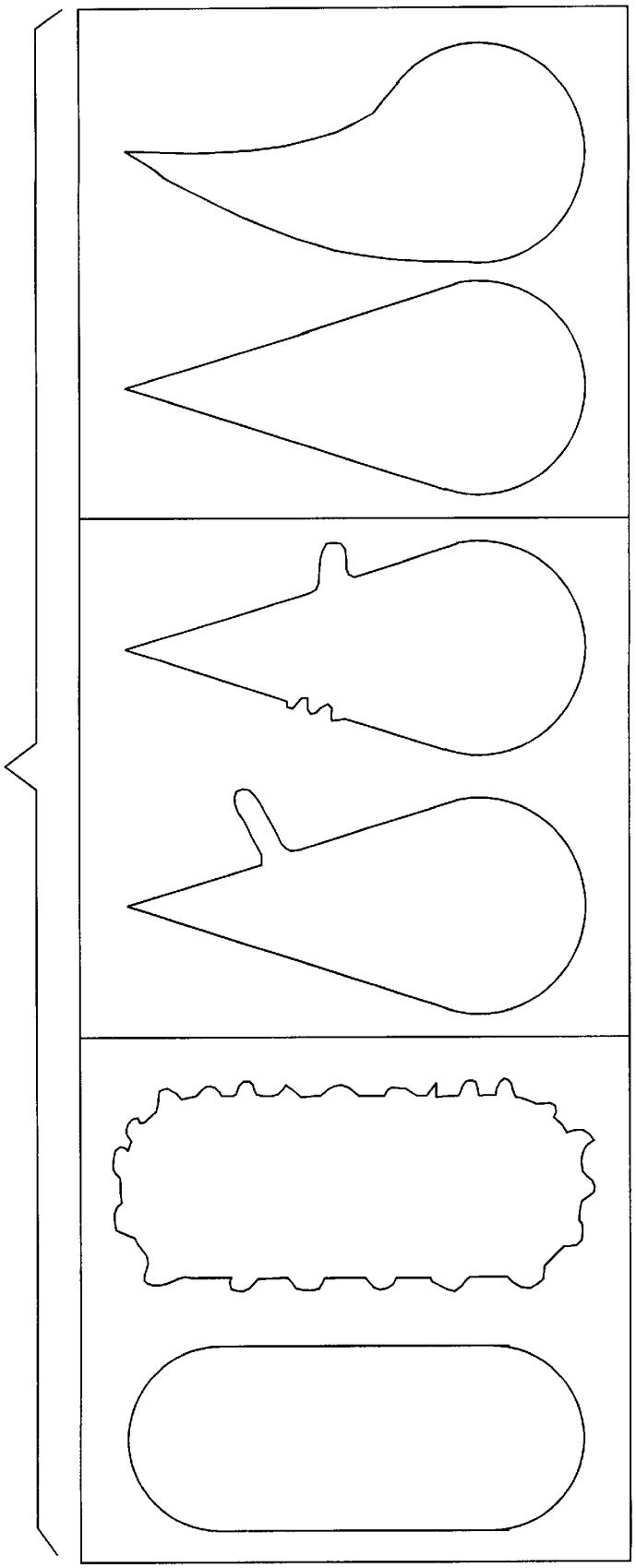

A core-based tool for the efficient construction of shape templates

Registration, Segmentation, Shape Change Measurement, and Intra-Operative Treatment Guidance CAD and Morphing Use of an object hierarchy to segment structures in an axial CT slice through the abdomen.
(a) Original configuration of object models (on an unclassified image. (b) Final template configurations following hierarchical object localization and local object posterior optimization.

FIG. 10
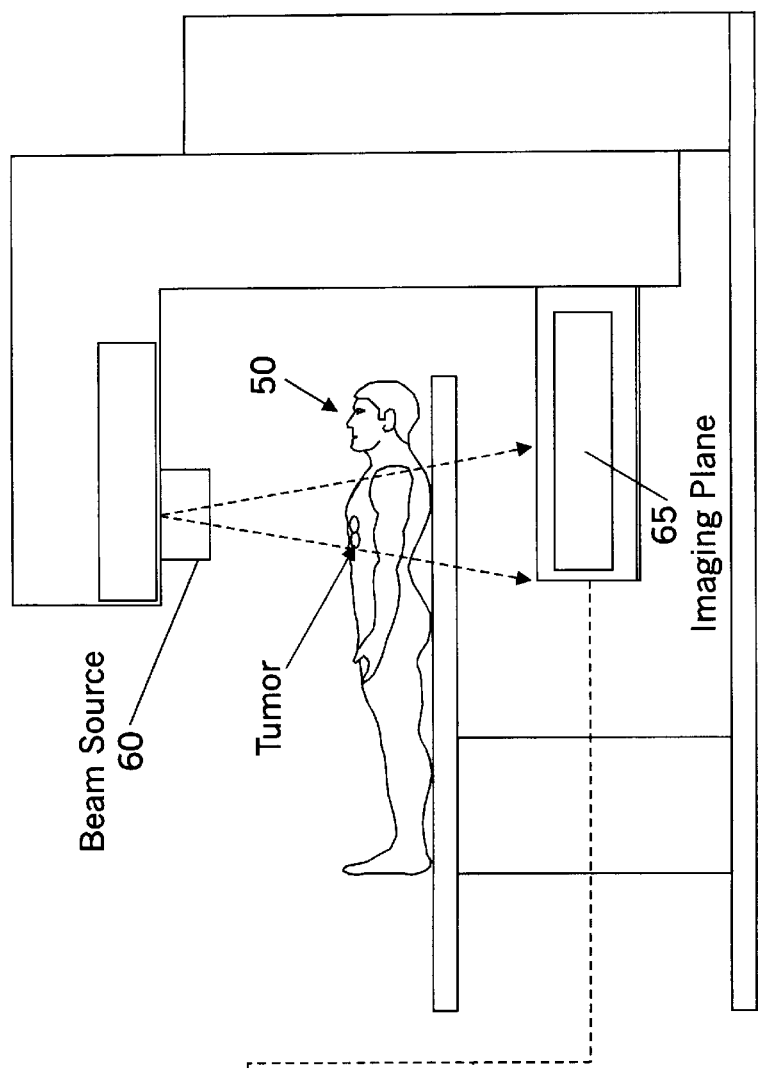
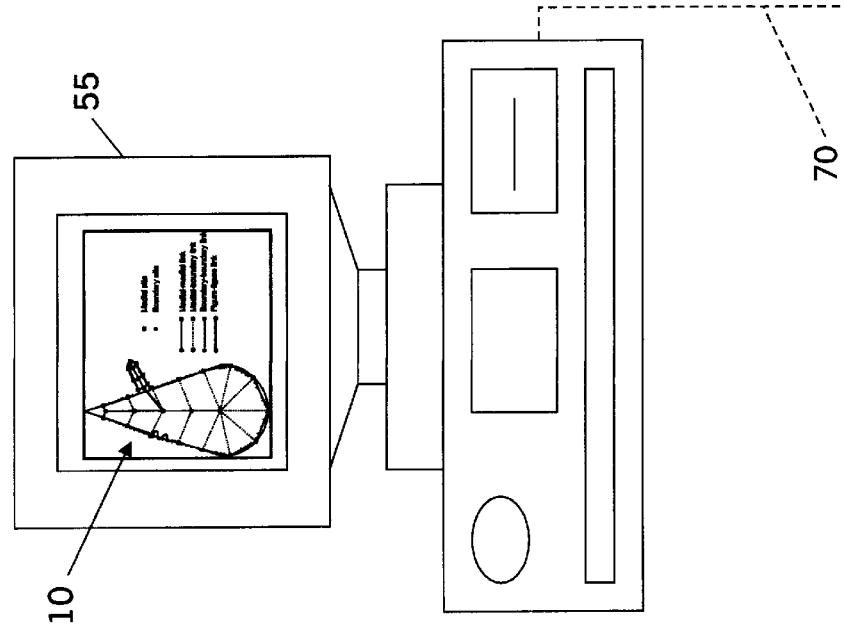

Stimulated cores from a magnetic resonance image illustrating the invariance properties of cores under rotation and magnification (top row) and the insensitivity of cores to image noise, blurring and object constrast (bottom row)

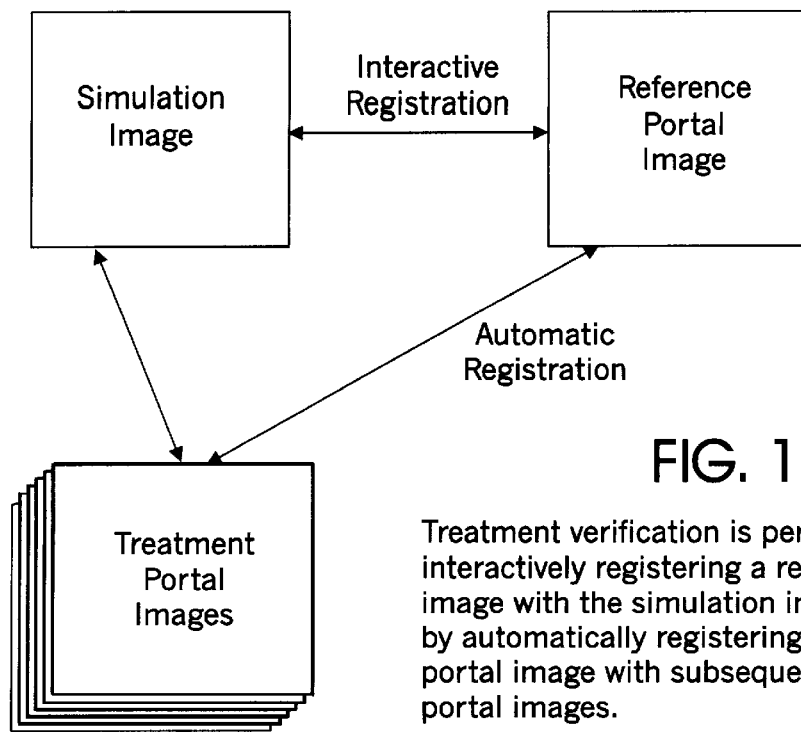
FIG. 12
Treatment verification is performed by first interactively registering a reference portal image with the simulation image and thereafter, by automatically registering the reference portal image with subsequent treatment portal images.
FIG. 14B
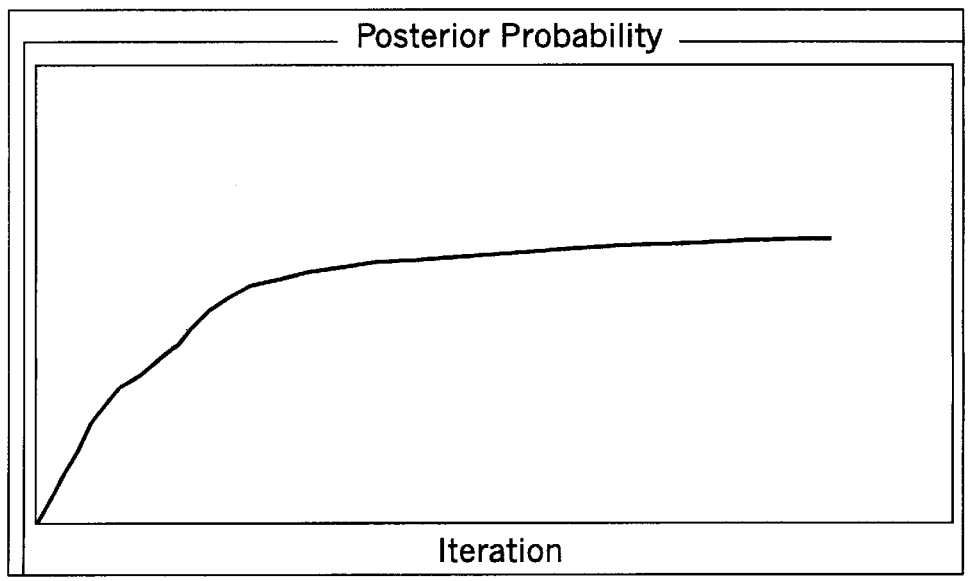

FIG. 13

Effects of image disturbances on boundariness and medialness. Top row, left to right: Original image and graphs of boundariness (gradient magnitude) and medialness (at optimal scale). Bottom row, left to right: Image with additive noise and graphs of boundariness and medialness. Note the greater prominence of the ridge of medialness than the corresponding ridge of boundariness, for the noisy image.

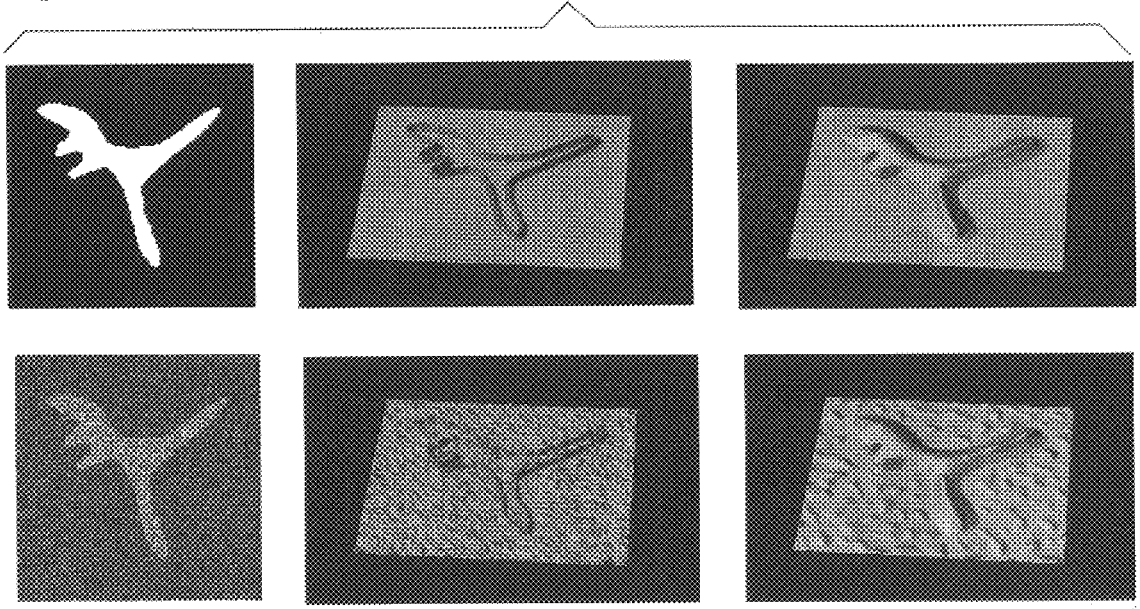

FIG. 14A

Initialization of the model's global parameters on a warped image. (a) Original model superimposed on the training image. (b-e) Various states of model initialization on a warped image of the ventricle. (b) Initial mapping of the model to an image. (c) Position of the model after global initialization. (d) Position of the model after the left figural initialization. (e) Position of the model after right figural initialization.

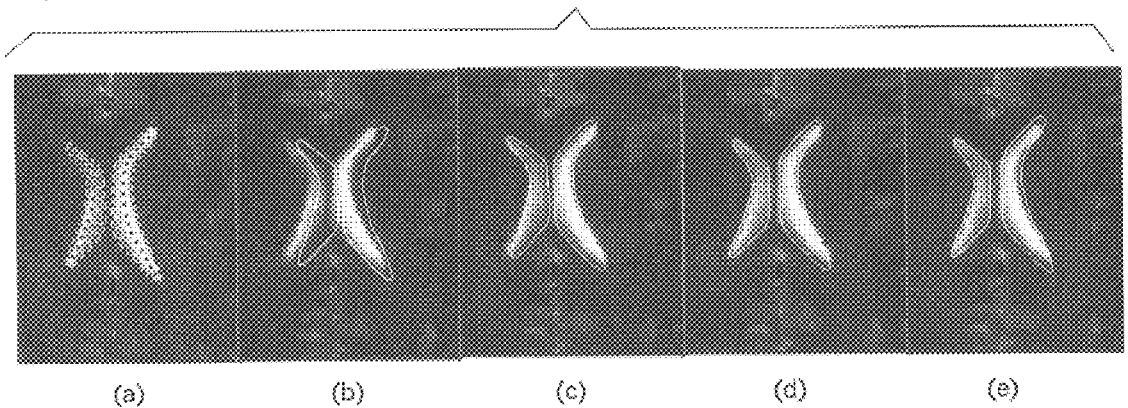

Boundaries resulting from optimization of the posterior probability function in warped images. The standard deviations for the warps, $\sigma_{warp}$, were 2, 4, and 8 pixels for the left, center, and right images, respectively. Note the inability of the method to conform to the lower end of the left-side of the ventricle in the center image due to lack of use of measurements capturing figural endness.

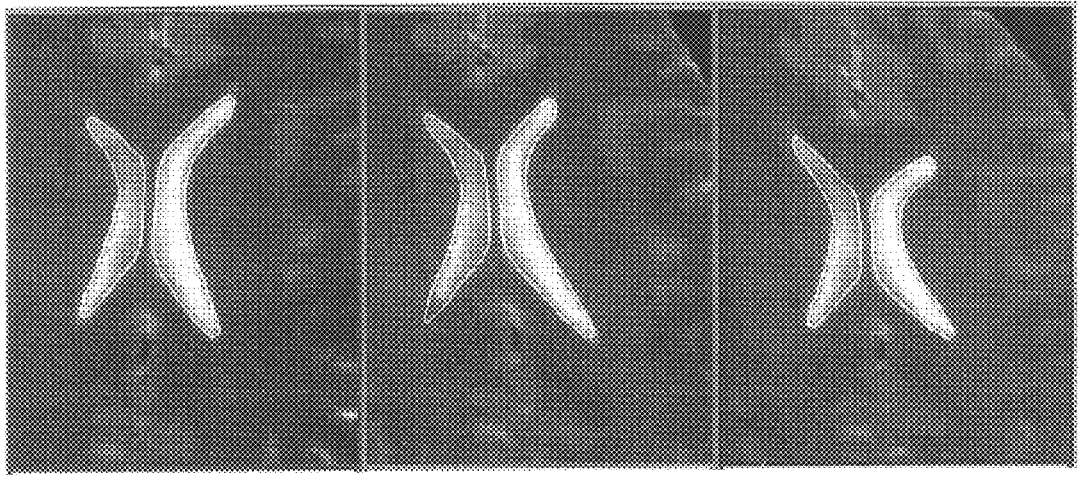

FIG. 16

A five-figure model of a ventricle, with inter-figural links, superimposed on its training image

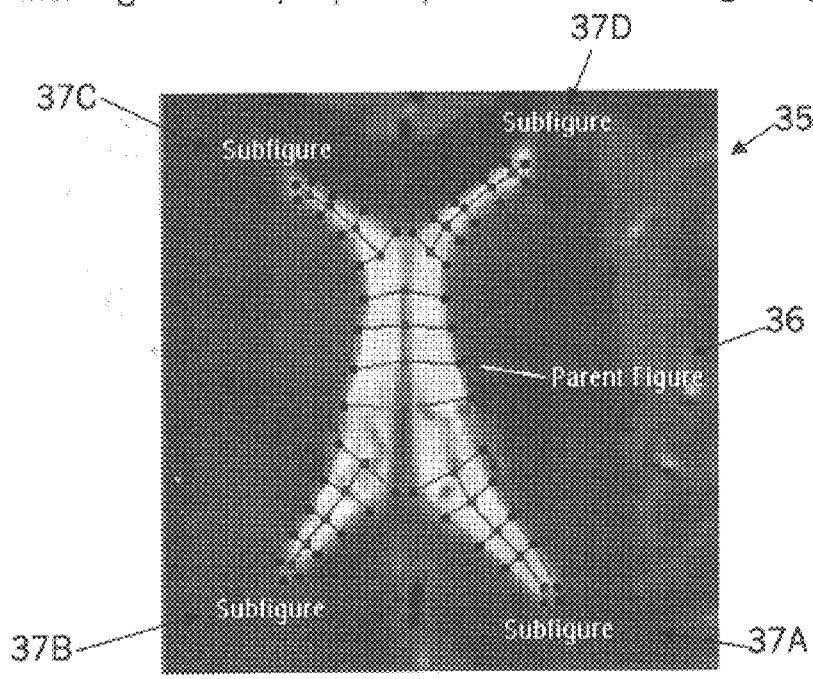

Final position of the deformed template sites on ventricles taken from a population of images from many patients. The model template used in the optimization is shown in Fig. 4A Segmentation results from a 2D external model of the liver. Top row shows 3 adjacent CT slices through the liver with the defined boundary in the initialized model superimposed. The full model is shown on the middle training image. Bottom row shows the same slices with the optimized model boundary superimposed.

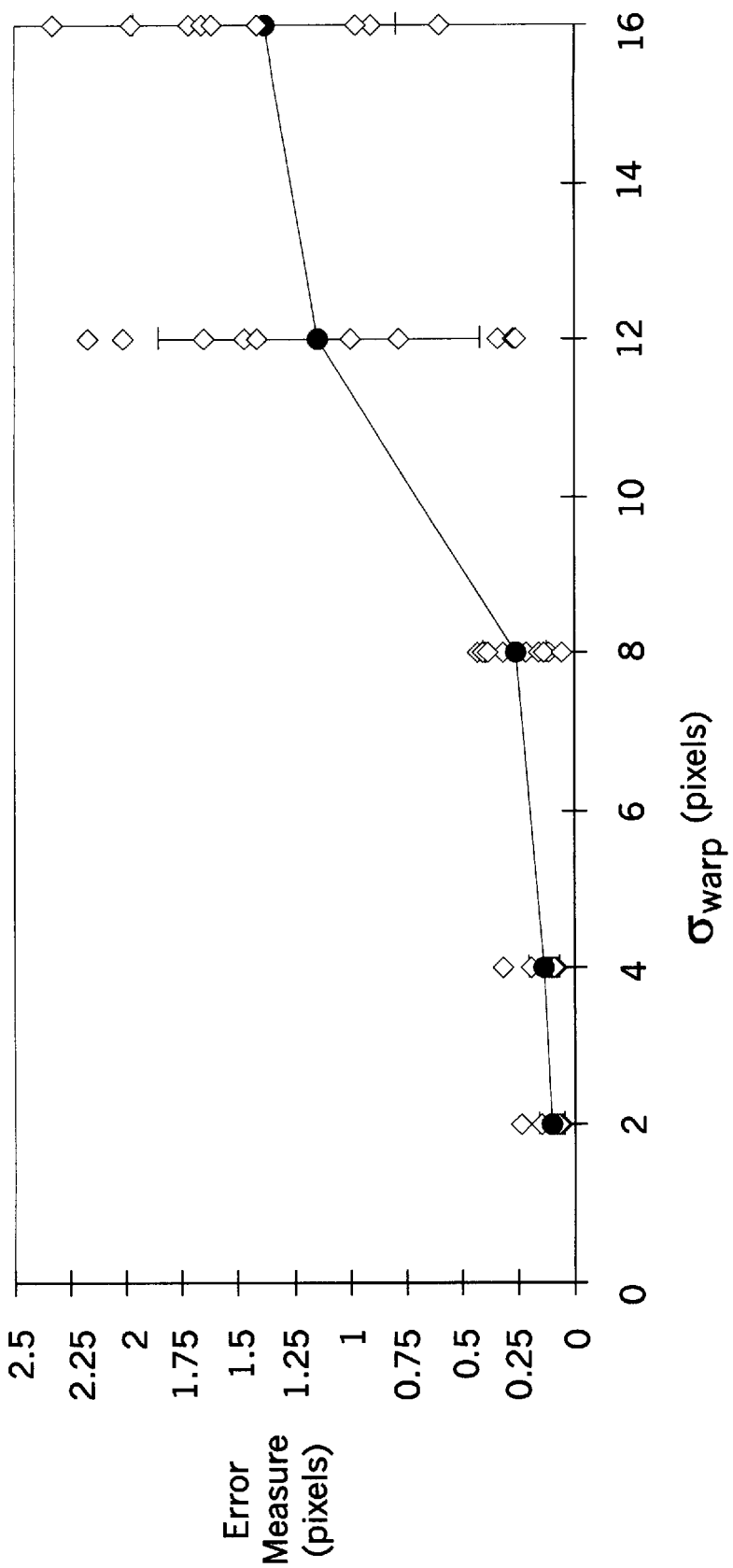

Boundaries resulting from optimization of the posterior function for increasing levels of noise (SNR -6, 3, and 1.5 from left to right)

Mean segmentation error (in pixels) plotted as a function of image noise for a warp of 8 pixels.

IMAGE OBJECT MATCHING USING CORE ANALYSIS AND DEFORMABLE SHAPE LOCI

This invention was made with government support under grant numbers, PO1 CA 47982-04 and RO1 CA67183 awarded by the National Cancer Institute and grant number RO1 LM05508-1 awarded by the National Library of Medicine. The government has certain rights in this invention.

FIELD OF THE INVENTION

The present invention relates to image matching, and more particularly relates to the representation and recognition of objects in images. Such object representation and recognition is particularly suited to registration and segmentation of objects in medical images.

BACKGROUND OF THE INVENTION

Segmentation is a procedure for identifing and defining individual objects in images containing objects with various attributes such as size, shape, texture, spatial location, contrast, brightness, noise, and context. For a number of diagnostic and therapeutic medical applications, segmentation of medical images is necessary for defining normal anatomy and pathology. In the practice of radiation therapy, for example, physicians use radiation therapy to treat a variety of cancer types in many patients. Radiation therapy employs a successive series of radiation sessions over a period of time which direct high energy photons into a treatment area in a patient's body. This radiation therapy is carefully directed into a predetermined treatment area in the patient's body and, because each patient is unique, this radiation treatment area and the resultant therapy is patient specific.

Conventionally, a patient's treatment plan has been determined via a labor intensive process. In this process, a highly trained technician or physician reviews an initial planning image of a patient. In determining the proper treatment area for radiation therapy, the physician must rely on prospective treatment planning to carefully evaluate the size, shape, and position of anatomical objects in the area needing treatment in order to select, shape, and aim radiation beams in such a way that a high dose of radiation is delivered to the tumor target while minimizing the dose to nearby sensitive normal tissues that typically cannot be completely avoided. Directing radiation into non-affected adjacent regions may produce undesired side effects because those regions can be susceptible or sensitive to certain dosages of radiation. Segmentation of computed tomography ("CT") or magnetic resonance images ("MRI") to define sensitive normal organs and tumor volumes is a critical step in the radiation treatment planning procedure. In particular, segmentation allows the physician to visualize the spatial relationships of the defined anatomical structures relative to the paths of alternative treatment beams, and to analyze the radiation dose-volume histograms for the defined structures for all possible beam arrangements.

Unfortunately, even if a patient treatment plan is carefully constructed to account for the location of both the cancer and the sensitive non-affected regions, even small errors in set-up due to beam angle or patient position during the delivery of such therapy can inadvertently misdirect radiation into those regions. For this reason treatment portal images are routinely acquired to confirm that the patient and treatment machine are correctly positioned. For example, as shown in FIG. 1A, an X-ray planning image of the affected region is taken which displays the affected region and various adjacent regions of the body. A physician or technician then reviews the image and identifies the effected area and the non-effected area (and radiation avoidance areas) by drawing lines over various contours of landmarks in the image to define a shaped radiation treatment beam which will irradiate the treatment area and block predetermined adjacent regions of the patient. FIG. 1B illustrates a corresponding treatment portal image generated from the shaped treatment beam as defined on the planning image shown in FIG. 1A. The high photon energy used in treatment is different from the imaging energy used in typical imaging modes and makes the image path harder to discern in the film. This further complicates verification of the treatment path in the patient's body. The planning image and treatment portal image are typically compared to determine whether the patient and treatment machine are correctly aligned. Automatic comparison of the images typically involves identification and segmentation of corresponding fiducial structures appearing in both images, and registering the two images based on a transformation matrix determined by automatically matching the fiducial structures.

Segmentation is also required in a number of other medical procedures that affect patient care decisions, and for research involving new diagnostic and prognostic tests. The number of application areas and the number of patient procedures requiring object definition are increasing and will increase even more as visionary implementations of augmented reality, and the virtual examination and operating rooms, make inroads into medicine.

Most segmentation methods in routine clinical use employ semi-automatic edge detection and thresholding for defining objects with sharp boundaries, and manual contouring for defining objects with poorly imaged boundaries. These current methods require many user decisions that are affected by factors such as the type of display device and its settings, the lighting environment, the user interface, user training and experience, the user-perceived importance of the object in the medical application, user fatigue, and time constraints. The intense user interaction associated with these methods typically adds significant cost to medical procedures which require image segmentation. Time and cost reductions, and elimination of factors that affect human performance, depend heavily on the development of robust automatic or semi-automatic segmentation approaches that are reproducible and insensitive to image disturbances. Preferably, such approaches should be able to define objects in interactive time in order to allow a computer to "know" which voxels are affected by a particular command when a user interacts with the images, and to perform operations to simulate interventional procedures. For example, in certain implementations of an augmented reality stereotactic biopsy procedure, automatic real-time segmentation is generally required to allow a computer to smoothly display the advancing surgical probe on sequentially acquired images.

In the past, attempts have been made to address the increasing clinical need for more reliable and automated means for segmenting objects in medical images. Some of the more promising techniques employ Markov Random Field ("MRF") methods in their analytic approach. Conventionally, such MRF models use sites which represent picture elements (pixels) or volume elements (voxels). Pixels and voxels represent discreet areas or volumes of an image in which image properties are assumed to be constant. Typically, in such models, MRF variables represent image intensities at a site or a region identifier for the site. As such, neighborhood structures between sites are typically specified as containing only nearby neighbors. Alternatively, some have used extended neighborhood structures, but retain pixel based specifications. See e.g., Johnson et al., *Analysis and Reconstruction of Medical Images Using Prior Information, With Discussion, Case Studies in Applied Bayesian Statistics* II, pp. 149–238 (Springer-Verlag, 1995). Others have attempted to use models which incorporate some form of a priori information about the characteristics of the object boundary, typically requiring the extracted boundary be sufficiently smooth. Still others, such as Cootes et al., *The Use of Active Shape Models for Locating Structures in Medial Images, Information Processing in Medical Imaging* (IPMI) (Spriner-Verlag 1993) and Chakraborty et al., *Deformable Boundary Finding Influenced by Region Homogeneity,* Proc. Conf. Computer Vision and Pattern Recognition (CVPR), pp. 624–627 (1994), have used combinations of those approaches and look at both boundary based and regional intensity properties of the object during the modeling process. Each of the above described approaches can constrain the final segmentation of an unclassified image which is driven by data or measurements in the unclassified image. However, high level analytic tasks that require modeling of global image morphology and the like are relatively hard to model, and are computationally intensive within the MRF framework. Further and disadvantageously, prior techniques have had difficulties modeling images in the presence of image disturbances such as noise and/or shape variations.

OBJECTS AND SUMMARY OF THE INVENTION

It is a first object of the present invention to provide a more reliable, and computationally efficient method for automatic recognition of objects in images which is tolerant of shape variability and image disturbances.

It is another object of the present invention to provide a faster, more economic way to register or segment radiotherapy planning images.

It is yet another object of the present invention to model objects based on shape and to recognize one or more similar objects in an image based on the model shape.

It is still another object of the present invention to provide a standard image shape representation which is deformable in a subsequent image.

It is a further object of the present invention to detect errors in radiotherapy treatment set-up by determining positional, rotational, and zoom variance of an object between a planning image and a subsequent treatment image.

These and other objects, advantages and features are provided by methods, systems, and computer program products which provide deformable shape loci object representation and recognition patterns. In particular, a first aspect of the present invention produces a representation of an object shape by establishing a shape hierarchy recognition pattern based on the shape of a target object in a digital reference image. A medial axis is defined along a dimension of a figure of a target object, the medial axis having a plurality of medial sites there along. A plurality of medial to medial ("MM") link segments defined by adjacent medial sites are generated. First and second boundary sites for each of the medial sites are also generated such that the boundary sites are separated by the medial axis. Similarly, a plurality of medial to boundary ("MB") link segments and boundary to boundary ("BB") link segments are generated. Each MB segment is defined by a respective one of the first and second boundary sites and a corresponding one of the medial sites and the BB link segments are defined by adjacent boundary sites. An object shape template is then generated based on the medial sites, the boundary sites, the MM segments, the MB segments, and the BB segments. Preferably, each interfigural shape is represented by generating at least one figure to figure ("FF") link segment corresponding to each identified subfigure where the FF link is connected to a selected site on the related figure. Further preferably, variation of width of the object along the medial axis is determined by optimizing medialness and determining local boundariness measurements. Preferably, and advantageously, the template is generated such that it is deformable when applied to the object in a target image. Also preferably, an objective function, measuring the agreement of the deformed template with an object in the target image and the difference in the model links in the deformed template and those of the model template, is optimized to recognize and segment target objects.

Advantageously, this shape-based deformable representation model is tolerant of shape and positional variances as well as image disturbances. Additionally, the relational model has a locality of the links which allows it to localize shape anomalies or locations in which the intensity relations in clinical image deviates from what is expected. Further, the availability of links allows the method to imply directions in which intensity derivatives reflecting boundariness should be taken. In addition, the locality of the model allows one to designate the intensity properties reflecting boundariness as a function of boundary site. Thus, luminance change polarity, intensity range, contrast range, and the choice of type of edge: e.g., outline vs. luminance edge vs. texture edge, can be designated with each boundary site.

An additional embodiment of the present invention is directed towards synthesizing objects in computer graphics producing a representation of object shape by establishing a figural shape hierarchy recognition pattern based on the shape of a target object having a plurality of subfigures therein. The shape representation is generated as described above, except that the template employs only MM links and loci to compute correlations and to calculate boundaries. The template is used for designing objects using a successively developed figural hierarchy, defined by successive decreases of spacing of sites in each figure's representation, wherein points are computed on a boundary contour relative to linked medial sites, and wherein the contour is interpolated based on these computed boundary points with each figure in this hierarchy associated with an image to be rendered and graphically displayed. The object is then morphed from a first beginning position to a second end position by interpolation of the medial sites in the figures held in common between the beginning and end positions.

An additional aspect of the present invention is directed to the automatic registration or segmentation of anatomical features for radiation therapy or diagnostic evaluation. First, an initial digital image of a predetermined anatomical region of the body is generated. A model template of a desired object within the initial image is made using scale-space relationships. The model template includes a skeletal grid defining relational deformable shape loci and links, including a medial axis, a contour boundary shape, MM links, MB links, and BB links. An unclassified target digital image of a desired region in a patient's body is generated and the model template is applied to the unclassified image to automatically find the corresponding object in the unclassified target image. The template deformable shape loci and links are allowed to deform to match the contour and core of the corresponding object in the unclassified target image. Relational measurements associated with the model template and the target object shape are determined and the target object shape is optimized. Measurements associated with the model template and the target object are correlated to determine at least one of registration and segmentation of the target image.

Additional aspects of the present invention include embodiments of the invention in a computer program product and system. For example, a computer program product for object recognition which employs a deformable loci skeletal grid representation pattern, and a system for providing same.

The foregoing and other objects and aspects of the present invention are explained in detail in the specification set forth below. As will be appreciated by those of skill in the art, the present invention may be embodied as a method, system, apparatus, or computer program product.

BRIEF DESCRIPTION OF THE DRAWINGS

FIG. 3A is schematic representation of three pairs of objects with similar shapes and various differences;

FIG. 10 is a perspective view of an imaging system showing a patient being imaged with the automated image recognition method of the present invention;

FIG. 12 is a schematic illustration of treatment verification via interactive registration of a simulation image with a reference portal image, and subsequently automatically registering the reference portal image with subsequent treatment portal images according to the present invention;

FIG. 13 illustrates the effects of image disturbances on boundariness and medialness according to the present invention. FIG. 14A illustrates an example of the deformation of a model to a localized object (left to right);

FIG. 14B is an iterative graph of posterior probability versus iteration for the model as it is optimized;

FIG. 15 is a pictorial representation of images which illustrate boundaries resulting from optimization of the posterior probability function in test object warped images;

FIG. 16 illustrates a five-figure template model of a ventricle with inter-figural links superimposed on its training image;

FIG. 18 illustrates segmentation results from a two-dimensional external model of the liver employing gap spacing between objects such as the liver and kidney, the liver and the chest wall, and the like;

FIG. 19 is a graphical illustration of warped images and mean segmentation error measured in pixels associated therewith;

DETAILED DESCRIPTION OF PREFERRED EMBODIMENTS

Figure 1A:
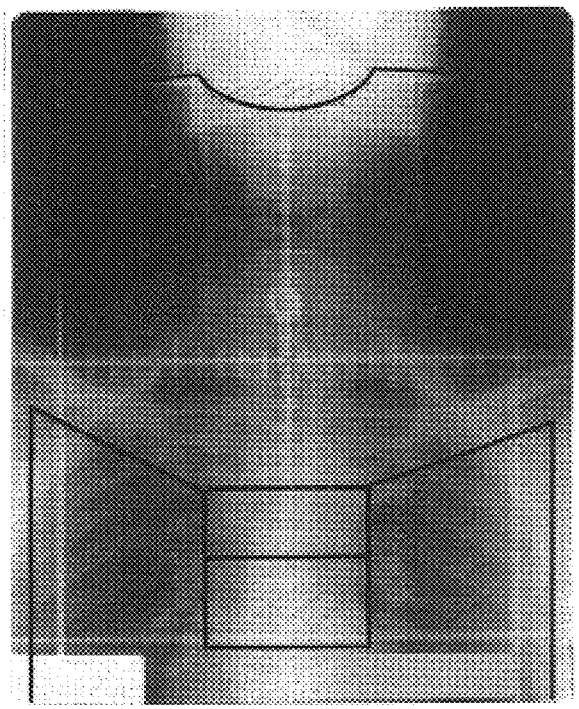
FIG. 1A shows a conventional planning image of a patient undergoing radiation therapy.
Figure 1B:
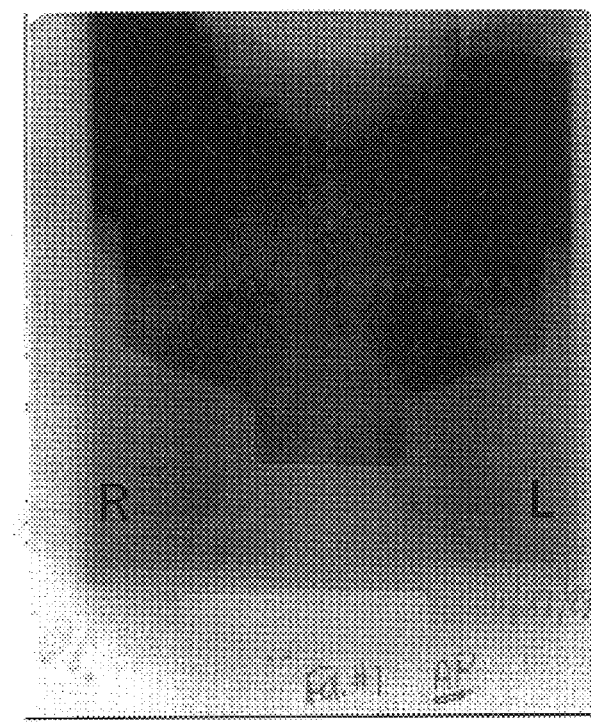
FIG. 1B shows a corresponding treatment image of the planned treatment shown in FIG. 1A.

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout. In some figures, the thickness of layers and regions have been exaggerated for clarity. As will be appreciated by one of skill in the art, the present invention may be embodied as methods or devices. Accordingly, the present invention may take the form of an entirely software embodiment or an embodiment combining software and hardware aspects.

Generally described, the present invention employs an object representation shape-based hierarchical structure which uses core-analysis techniques. More descriptively stated, the present invention employs a skeletal-like medial framework or grid of medial loci and a set of corresponding boundary loci which are positioned along a contour or perimeter "boundary" of the object. The medial loci and the boundary loci are relationally linked. This relational framework is employed to generate a template of the object shape. Core analysis of geometrically stable objects in images, such as organs and bony structures in gray scale medical images, allows a means for automatically segmenting anatomical objects in unclassified images and matching multiple images, and lends itself to a variety of methods for deriving a transformation matrix that matches or registers particular objects within one image with another.

This shape template, defined from one or more initial images, can be used as a means to match the initial image with a subsequent image in a manner which is resistant to position induced interference such as image rotation, translation or zoom. Advantageously, the template loci and or links can be flexibly deformed to more precisely align with the shape of the subsequent image. The data provided by the template loci (and or links) and the deformed loci (and or links) can be statistically correlated to give a "graded" measurement of position and fit between the template and the object in a subsequent image. For example, when used to verify set-up in a diagnostic or radiation therapy application, a template defined from an initial reference or planning image can be matched to the corresponding object in a subsequent image as a means for determining a transformation matrix which registers the reference and subsequent images. Translation and rotation parameters of the transformation matrix can be used to determine the degree to which the patient and equipment are correctly aligned. This will allow an operator to proactively correct the error and facilitate correct treatment. As will be described further below, this information can also be used to measure useful parameters such as shape changes and anomalies, as well as set-up errors and the like. Advantageously, this type of information can help monitor disease progression and proactively adjust radiation therapy and the like. FIG. 10 illustrates a patient undergoing radiation therapy or diagnostic imaging. The patient 50 has a tumor which is displayed on a computer 55. A beam source 60 irradiates or images a preselected area of the body. The image is generated on an imaging receiving device 65 located in the imaging plane and is digitally fed via a input line 70 to the computer 55. This shape template defined from one or more initial images can be used as a means to segment corresponding objects in unclassified images in a manner which is resistant to image disturbances and position induced interference such as image rotation, translation, or zoom. When initialized in a target or unclassified image, the template model of a particular organ can be used as a means to automatically recognize, extract for analysis, or segment the corresponding object appearing in the unclassified image. The initialization involves positioning the template close to the object to be segmented in order to avoid convergence to local minima during the optimization process. Such convergence problems in other methods can occur with even modestly poor initializations. To avoid convergence, other methods use coarse-to-fine schemes in which either the most salient features are first considered, or use multi-resolution images in a top-down fashion where the output at a lower resolution image is used as the input to the next highest-resolution image. Advantageously, the instant invention which employs deformable shape loci uses a formal prior that implicitly recognizes scale as an important descriptor of figural shape, allowing initialization via saliency of figures captured by the statistics of the figural hierarchy and via multiscale information in the form of the core points which carry with them figural width information.

In one embodiment of the instant invention, initialization of a template model in a target image containing an object to be segmented or otherwise analyzed occurs in three stages. In the first stage, the model template is mapped to the image space of the candidate image by performing a rough global registration of the training image and the candidate image to establish the approximate location of the object in question. In the second stage, an optimization procedure is initiated which fits the collection of core points to their respective positions in the candidate image via maximization of the sum of the medialness in the candidate image at the template core points as a function of a global translation, rotation, and scaling applied to the template. Due to the use of relatively large scale medial information, this stage is remarkably robust in the presence of small-scale image disturbances, such as boundary and/or intensity noise, and exhibits a region of convergence for translation on the order of the average scale (half-width) of the figures comprising the object. In the third stage of initialization, each of the individual figures within the object figure is allowed to deform rigidly (with magnification) in order to optimize the same objective function as with global initialization. This step allows for any small adjustments in the position, orientation, and size of the figures relative to the global object shape.

Once the template is initialized, the template links are allowed to deform locally in order to optimize the log of the posterior probability, taking advantage of the stability properties of the relatively large-scale medial points by first performing sequential, local optimization over all core points with associated boundary points moving in concert so as to maintain the deformation energy in the core-boundary links at its post-initialization level. This allows the template links for each individual figure to deform based on the most stable features, the medial points, and thus to adjust to slight variations in figural shape from the prior mean. Following this step, all of the template points are allowed to move, in a sequential fashion, in an attempt to optimize the posterior probability. During this stage, the boundary points, which have been approximately aligned with the image features by the initialization process and by the previous step, move toward regions of high boundariness subject to the stabilizing constraints imposed by the prior links.

The boundary of the segmented object is refined using a constrained deformable boundary technique initialized by linear connections between linked boundary model points, i.e., the boundary points of the deformed template are fixed and the boundary segments between the points are determined by embedded deformable contours.

In operation, a first image or a training image is generated and used to define a basic or standard shape for a "figural" template model. This figural template model represents a particular object in a format which can be analyzed by a computer. In practice, this model is preferably based on a normalized patient population shape, i.e., a statistically normalized shape. Alternatively, the first image can be a base image of a particular patient. As will be appreciated by one of skill in the art, each is useful for different applications. As will also be recognized by one of skill in the art, other ways to generate a base or standard object template can also be employed. Once generated, this shape model can be used to match similar shapes in subsequent images with minimal user input labor.

Figure 2:
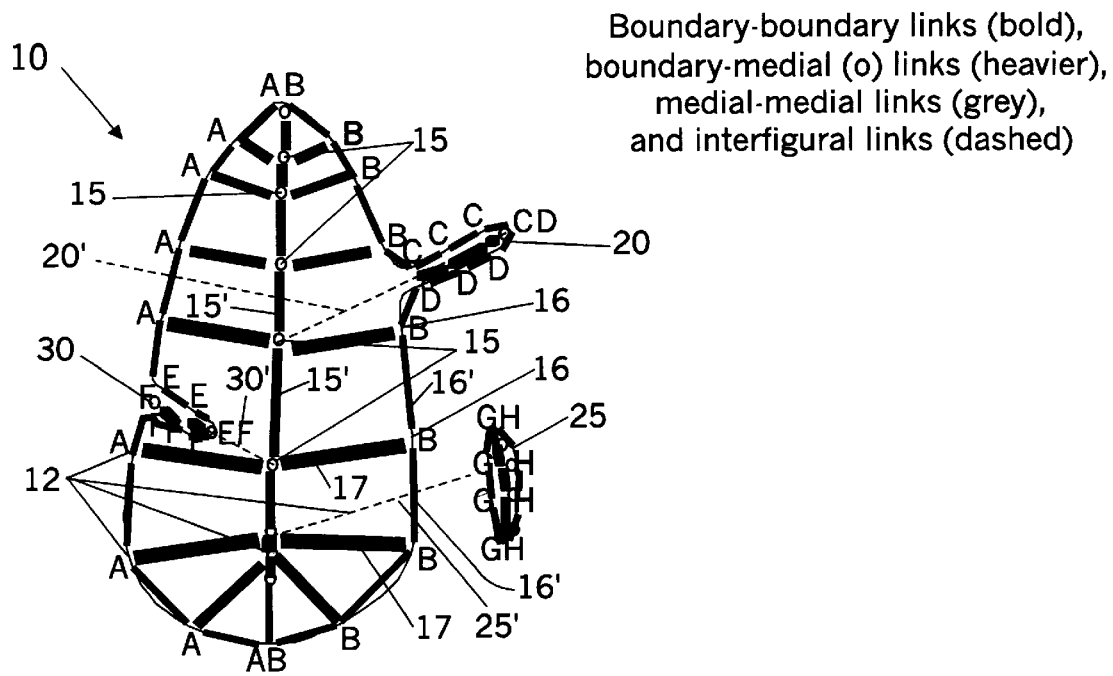
FIG. 2 is a schematic illustration of a shape representation of an object according to the present invention which illustrates a primary figure with attached and detached protrusion subfigures and an indentation subfigure.
Figure 3:
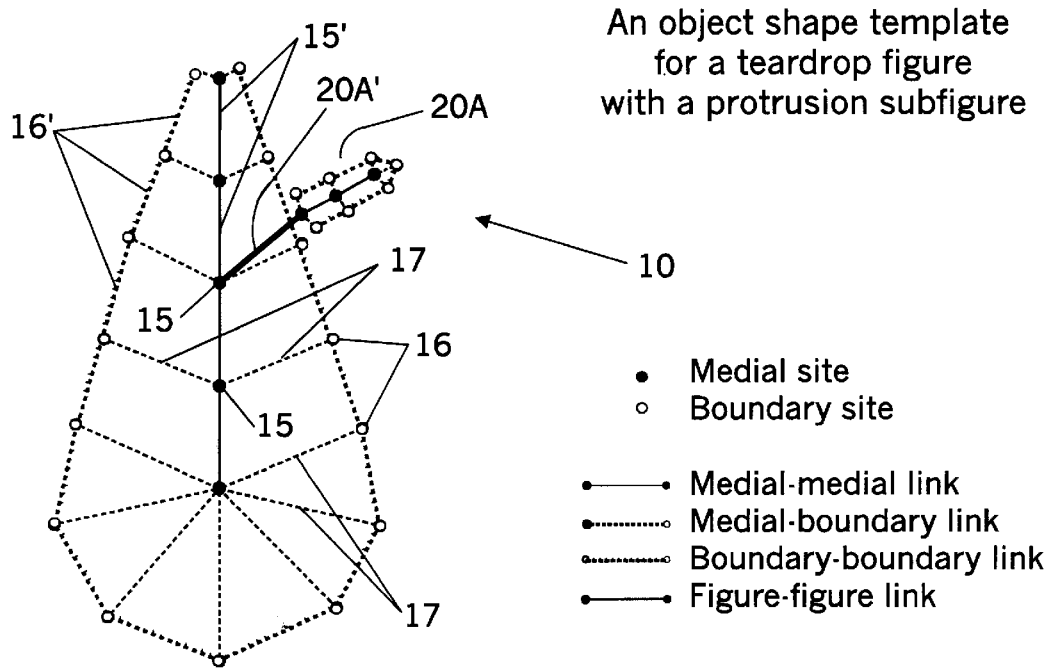
FIG. 3 is a schematic illustration of an additional object shape model according to the present invention which illustrates a primary object linked to a protrusion subfigure.

FIGS. 2 and 3 show embodiments of an object representation shape-based structure 10. The shape shown is represented by a skeletal grid 12 of loci and links. The loci can be described as medial or boundary loci, 15, 16, respectively. The loci positioned along the center or "core" of the object are called medial loci 15. The loci positioned around the contour or perimeter of the object are termed "boundary" loci 16. Each of the medial loci 15 are joined to adjacent medial loci by medial to medial ("MM") links 15'. Similarly, the adjacent boundary loci 16 are joined by boundary to boundary links ("BB")16'. Further defining the template structure, a medial loci is joined to the corresponding boundary loci by a boundary to medial link ("MB") link or links 17.

Advantageously, this model can also identify subfigures or neighboring figures in the template. FIG. 2 illustrates an object with subfigures 20, 25, 30. Preferably, each of the subfigures 20, 25, 30 are relationally attached to a selected medial or boundary locus 15, 16 (shown here as by a medial loci) by a corresponding inter-figural ("FF") link 20', 25', 30'. Further preferably, the subfigure is attached to a selected medial locus and a proximal endpoint of the corresponding subfigure, and as such defines the end points of the FF link 20. As shown, each of the subfigures includes its own set of medial loci and links. Subfigure 20 is a protrusion which is proximately positioned to the main figure boundary. Subfigure 25 is spaced apart from the main figure and subfigure 30 is an indentation in the boundary of the main or parent figure. This model can include each of the shape variations for a more accurate recognition method.

Figure 4A:
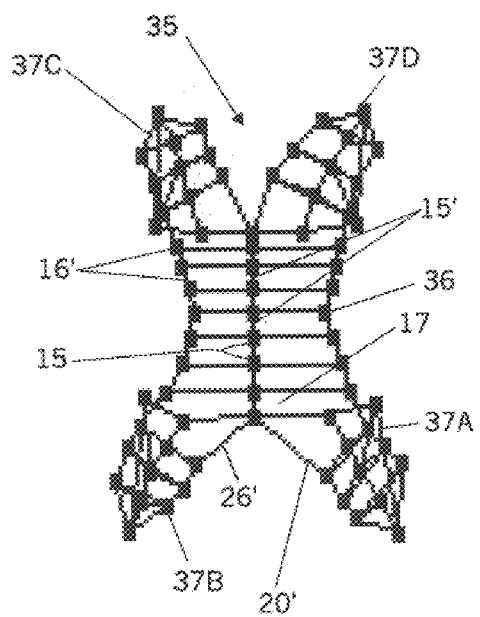
FIG. 4A is a schematic illustration of a stylized template illustrating a model ventricle shape of a ventricle segmentation.
Figure 4B:
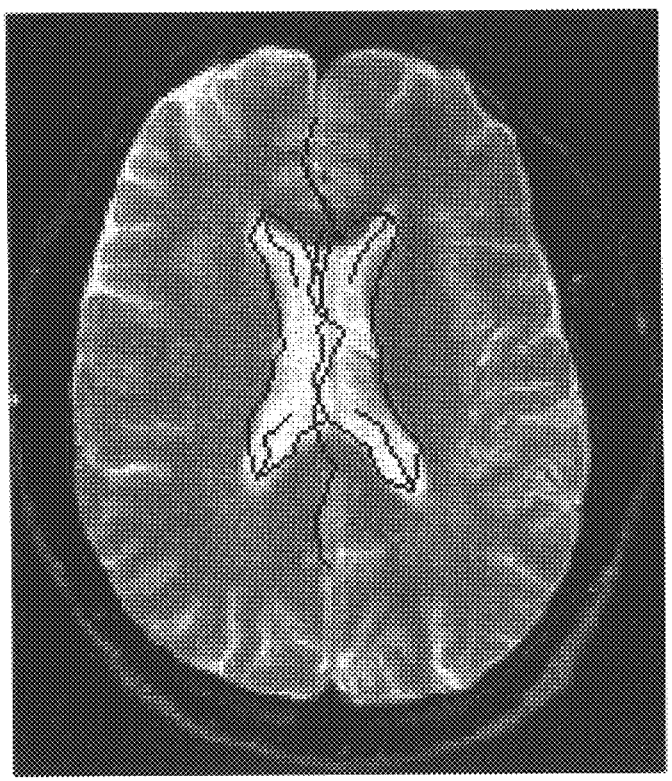
FIG. 4B is an illustration of a template projected onto an image space.

FIGS. 4A and 16 illustrate an additional embodiment of a template, using a ventricle as the object desired for recognition. As shown in FIG. 16, a primary or main figure may be further subdivided into a central or parent figure and linked subfigures to take advantage of figural hierarchies wherein the most "stable" part of the figure is used to establish approximate location of subfigures. Thus, a shape which may adequately be modeled with one or two subfigures, can be further divided as exemplary illustrated into a five-figure model. As shown in FIG. 4A, a template 35 is generated representing the ventricle with a parent FIG. 36 and four subfigures 37A, 37B, 37C, 37D corresponding to the four nodes or horns of the ventricle shape. As described for the template above, the parent FIG. 36 comprises a plurality of MM links 15', BB links 16', and MB links 17. Llinked medial loci 15 run longitudinally down the core or central portion of the both the primary or parent shape, and each of the subfigures 37A, 37B, 37C, 37D corresponding to each of the horns of the ventricle. Further, a set of FF links 20' connect neighboring boundary sites on the subfigures and the parent figure. FIG. 16 illustrates the five-figure template superimposed over its training image. Similarly, FIG. 4B illustrates a "high-probability" sample from the posterior distribution on the ventricle nodes of FIG. 4A. Interestingly, the boundary points in the template do not occur at scale 0, thus the boundaries appear somewhat smaller when projected onto the image space. This figure also shows estimated locations of middle points for the brain itself, which were not included in the model in FIG. 4A.

The templates discussed above advantageously employ global properties of object shape and component figures (or subfigures) as a unit which facilitates the automatic localization and segmentation of anatomical objects in medical images (as well as other objects in other types of digital images). As used herein, shape may generally be defined as a set of measurable properties of an object which are preferably resistant to a given set of geometric operations such as translation, rotation, and magnification or zoom. Localization, as used herein includes finding the approximate position, orientation, and size of a modeled object (and its component figures) in an image and then using the model shape template to approximate its shape properties. Registration as used herein includes correlating or matching the localized object with the template object to compute a transformation matrix whose translation and rotation parameters can be used to detect and measure setup errors. Segmentation, as used herein, includes identifying selected landmarks or objects in an image and further identifying the contour and core of the selected target object.

As shown above, the template representation models of the present invention preferably consider three aspects of an object's shape (a) figural shape (b) inter-figural shape and (c) boundary shape. Figural shape includes a description of the central axis or middle of a figure and the variation in direction and width of the object along that track. Inter-figural shape measures the relative position, size, and orientation of figures (main and subfigures) that comprise an object. Boundary shape includes the contour and boundary location relative to figural location and size. The difference between the adjacent boundary points are defined by boundary links which capture boundary curvature. Each of the aspects of the instant model yields information which can be analyzed in probability distributions and which can be applied to unclassified images using a formal Bayesian framework to localize and segment similar objects. Although specific correlation techniques will be described herein, as will be appreciated by one of skill in the art, alternative ways to achieve the relational correlation and calculations may also be employed within the scope of the present invention.

Bayesian Approaches to Model-Based Image Segmentation

Many of the model-based approaches to image segmentation may be cast in a Bayesian framework, wherein the model prescribes a prior distribution of allowable shape deformations and wherein the likelihood function describes how well measurements derived from the image accord with a given geometric state of the model. If $\Theta$ is a parameter vector describing a particular object model configuration and I is an image known to contain an instance of that object, Bayes rule allows us, given a particular image I, to relate the prior probability (a model of what we expect to see) to the a posteriori probability (what the image data supports given the model configuration) through the equation:

$$p(\Theta | I) = \frac{p(I | \Theta) p(\Theta)}{p(I)} \quad \text{(Equation 1)}$$

Where $p(\Theta/I)$ is the a posteriori probability (posterior), $p(I/\Theta)$ is the state-conditional probability density function for I (the likelihood function), $p(\Theta)$ is the α priori probability (prior), and $p(I)$ is a constant with respect to $\Theta$. In Bayesian, model-based image analysis the prior term assigns a probability to a given configuration of the model and, when combined with the likelihood function, permits one to perform recognition and/or segmentation through maximization of the posterior. Taking the logarithm on both sides of equation (1) yields $$\log p(\Theta) = Z + \log p(I/\Theta) + \log p(\Theta) \quad \text{(Equation 2)}$$

where the constant Z=–log p(I). Hence, maximizing the posterior probability may be accomplished through maximization of the sum of the log likelihood and log prior terms. In such a Bayesian framework, the problem becomes one of how to (a) model and encode object shape information in the prior term in a way that adequately captures normal object shape and its variabilities and that (b) permits the model to be combined with the image (via the likelihood term) through appropriate choice of image information consistent with the model representation.

Placing Active Contours within a Bayesian Framework

In papers on deformable contours, or active contours (snakes), an initial contour is deformed to optimize an objective function that is the sum of an image energy term, measuring the degree to which the contour matches the image data, and an internal energy term, measuring the degree to which the contour is smooth. See e.g., T. McInerney et al., *Deformable Models in Medical Image Analysis*, Proc. Workshop on Math Methods in Biomed. Img. Analy., IEEE Cat # 96TB100056, pp. 171–180 (1996). The reference is hereby incorporated by reference as if recited in full herein. This objective function, except for an additive constant, can be interpreted as the logarithm of the posterior probability p(Θ/I) of the location of the set of boundary sites Θ, given the image data I; the image energy can be interpreted as proportional to the log of the likelihood p(I/Θ); and the internal energy can be interpreted as the log of the prior p(I)/Θ), a model of expected shape properties.

Summarizing the above;

$$\begin{aligned}
\text{Objective function} &= \log \text{likelihood} + \log \text{prior} \quad (\text{Equation 3})\\
&= k_{image} \times \text{Image Energy} + k_{internal} \times \text{Internal Energy}\\
&= k_{image} \times \text{Boundariness Summed Over Boundary Sites} + -k_{internal} \times \text{Boundary Curvature Summed Over Boundary Sites}
\end{aligned}$$

where the boundariness at a location is the degree to which image intensities around that location in the image behave like a boundary at that point (for example, the gradient magnitude of intensity at the point is a commonly used measure of boundariness) and $k_{image}$ and $k_{internal}$ are constants which weigh the relative importance of the two energy terms.

The prior is intended to measure the degree to which the contour has the location, size, orientation, and shape of the family of objects that are to be extracted, e.g., of a particular organ. When attempting to model such object properties, models which employ a linked locus of medial and boundary sites can better capture these properties than models using a locus of only linked boundary sites. See e.g., A.

Wilson, *Statistical Models for Shapes and Deformations*, Ph.D, dissertation, Institute of Statistics and Decision Sciences, Duke University, Durham, N.C. (1995); Wilson et al., *Towards a Framework for Automated Image Analysis, Image Fusion And Shape Variability Techniques*, Proc. 16$^{th}$ Leeds Annual Statistical Research Workshop, University of Leeds Press (1996); Pizer et al., *Segmentation, registration, and measurement of shape variation via image object shape*, UNC Computer Science Technical Report, TRN96-031 (1996). These references are hereby incorporated by reference herein as if recited in full. Medial sites have not only a position, but also a width and yield two directions normal to the boundary at a scale proportional to the width. With such a locus, the agreement of the locus with the image, i.e., the image energy, involves not only the boundariness at the boundary sites but also the medialness at the medial sites, where medialness measures the degree to which the medial site, with its width and link directions, behaves as being medial between a pair of boundaries. Also, the log prior measures the variation of the inter-site links from a model. Therefore, the relations defining the objective function change as follows:

$$\begin{aligned}
\text{Objective function} &= \log \text{likelihood} + \log \text{prior} \quad (\text{Equation 4})\\
&= k_{image} \times \text{Image Energy} + k_{internal} \times \text{Internal Energy}\\
&= k_{bound} \times \text{Boundariness Summed Over Boundary Sites} + k_{med} \times \text{Medialness Summed Over Medial Sites}\\
&\quad + -k_{internal} \times \text{Sum of Variation Inter-Site Links From Model}
\end{aligned}$$

The method which the present invention implements involves creating such a model from a training image, and deforming the model to optimize the objective function.

Theory of Deformable Shape Loci

Turning now to some basic principles for deformable shape loci (DSLs) and the description of the construction of the prior (or external energy term) and the likelihood function (or image energy term) and the means for combining each to permit segmentation of an object via optimization of the posterior (the objective function). First, consider the three pairs of similar objects in FIG. 3A. The present invention captures, in a model, a means for describing how such shapes are similar and how they differ.

In the first case (left panel in FIG. 3A), note that both shapes appear tube-like and hence appear similar at the global, orfigural, level. Yet, one of the shapes has a smooth boundary while the other has a varying wiggly boundary. In the present invention, a model-driven approach to segmentation allows for recognition (at the figural level) of both of these instances of a similar object, while also providing for determination of differences in their local boundary shapes.

In the second case (middle panel in FIG. 3A), the overall shapes are similar and the objects may be described as being teardrop shaped. That is, they have a straight figural axis and a narrow top and increase in width from top to bottom. The overall boundary shape is also quite similar (i.e., the boundaries are relatively smooth), but these objects differ in that the position, size, and orientation of the protrusion relative to the tear-drop is different and in the appearance of a wiggle on a small portion of the boundary. If one considers the protrusion as an attached "subfigure" on the larger teardrop, then the natural way to describe the shape difference is to characterize how the shape of the subfigure varies in relation to the parent figure. We call this kind of shape relationship inter-figural shape and will show that it is possible to directly capture such aspects of object shape in a probabilistic model.

Finally (right panel in FIG. 3A) the objects are similar in the sense that they both have similar (smooth) boundaries, yet differ in the sense that the one of the objects appears straight while the other is curved at the figural level.

As will be discussed hereinbelow, a preferred way to first describe how to encode such aspects of object shape in a prior model called a shape or model template. Next to be discussed is a preferred way to construct a likelihood function which uses image measurements as to both figural (medial) and boundary features to allow for the stable extraction of objects from unclassified images via optimization of the posterior probability. In order to generate a robust model or template, the present invention employs (1) discrete, sparse set of points, the template sites, which serve as landmarks at which certain image features are to be measured, and (2) the local relations between these sites, template links, which serve to constrain the possible deformations that a template can undergo when it is applied to an image.

Specifing template sites in the prior

The template sites for the object shape models consist of an orderly arrangement of landmarks at which certain important image features are to be measured when the template is applied to an unclassified image. In general, these image features may be considered to be either multilocal (figural) or local (boundary) features, which are captured by medial measurements or boundary-based measurements, respectively. Each figure is represented by a set of linked medial sites, sampled from the core of that figure. The medial sites establish both the position and local width of the figure and specify a set of scaled medialness measurement apertures, each of which responds most strongly to centers of objects of similar width. In turn, each medial site is associated with a pair of boundary sites to which we associate a scale value proportional to the scale of the linked medial site. The scale value serves to establish the width of boundariness measurement apertures.

Specifying and using template links in the prior

The objective function has a log prior term that measures the difference in location, orientation, size (relative to a parent figure), and shape between a deformed model and the model itself. This measure is expressed in terms of differences in the links illustrated in FIG. 3. The measure has a basis in the theory of Markov random fields and Gibbs priors. See e.g. Wilson dissertation, supra. However, for clarity of discussion, that except for the multiplicative constant ($k_{internal}$ in Equation 4), the log prior term is simply the sum over the links of the norm-squared of the difference of that link in the deformed model from the same link in the training image:

$$\log \text{prior} = \qquad\qquad\qquad\qquad\qquad\qquad (\text{Equation 5})$$

$$-k_{internal}\left(\sum_{l_k \in MM \text{ links}} \|l_k - l_k^{model}\|^2 + \sum_{l_k \in MB \text{ links}} \|l_k - l_k^{model}\|^2 \right.$$

$$\left. + \sum_{l_k \in BB \text{ links}} \|l_k - l_k^{model}\|^2 + \sum_{l_k \in FF \text{ links}} \|l_k - l_k^{model}\|^2\right)$$

Using FIG. 3 as an example, the links labeled MM are the medial-medial links; those labeled MB are the medial-boundary links; those labeled BB are the boundary-boundary links; and those labeled FF are the figure-figure links.

As will be described further below, the links in the model can be specified in a process which will allow the deformation of the links when applied to an image desiring object recognition. Further preferably, a preferred measure of link difference such as that stated in equation 5 to calculate the prior term in the objective function.

The $k^{th}$ link connects two neighboring template sites, i and j. The model loci, and thus the links, are established through interaction with a user who preferably understands the shape in question and thus is able to specify which figures are of importance in the model. These figures might include not only portions of the anatomical object to be extracted but also those containing the object of interest (e.g., the whole abdomen when the object of interest is the liver), those in objects neighboring the object of interest (e.g., the gall bladder when the object of interest is the liver), or those made from the gap between the object of interest and a boundary of a neighboring object (e.g., the chest wall when the object of interest is the liver). For each figure that is to appear in the model, a medial locus must be extracted. Tools for aiding the model definer can facilitate this step. One way to do this is to use stimulated core extraction in this process, which is described in more detail below. Tools can also be employed that, given a figure's medial locus, calculate associated boundary points in the training image. Exemplary tools also are also described further below. Finally, the figure-figure links are preferably manually determined by the model definer via computer interface by defining which figure is a child of which parent figure.

In order to deform a model locus by optimization of the objective function, the norm of a link difference that is used is preferably the same for each link type. Each link $l_k$ is a vector in scale space specifying both 1) the vector $\overline{V}_k$ in image space (2D in this embodiment) that indicates the change of location between the $i^{th}$ and $j^{th}$ positions, $\overline{X}_i$ and $\overline{X}_j$, and 2) a pair of scales, $\sigma_i$ and $\sigma_j$, indicating the change in widths between the $i^{th}$ and $j^{th}$ positions.

The difference between a link's position and width of changes in the model and the corresponding pair of changes in the deformed model, is measured by the magnitude of the difference, in scale space geometry, between the two scale space vectors. This can be computed from a scale space distance function dss on two scale space points and a scale space cosine function $\cos_{SS}$ on two scale space vectors, both of which are defined in:

$$\|l_k - l_k^{model}\|^2 = d_{SS}^2[(\vec{x}_i, \sigma_i), (\vec{x}_j, \sigma_j)] + \qquad (\text{Equation 6})$$

$$d_{SS}^2\left[(\vec{x}_i^{model}, \sigma_i^{model}), (\vec{x}_j^{model}, \sigma_j^{model})\right] -$$

$$2d_{SS}[(\vec{x}_i, \sigma_i), (\vec{x}_j, \sigma_j)] \times$$

$$d_{SS}\left[(\vec{x}_i^{model}, \sigma_i^{model}), (\vec{x}_j^{model}, \sigma_j^{model})\right] \times$$

$$\cos_{SS}\left[(\vec{x}_i, \sigma_i) - (\vec{x}_j, \sigma_j), (\vec{x}_i^{model}, \sigma_i^{model}) - (\vec{x}_j^{model}, \sigma_j^{model})\right]$$

See also, D. Eberly, *A Differential Geometric Approach to Anisotropic Diffusion, Geometry-Driven Diffusion in Computer Vision,* BM ter Haar Romeny ed., Kluwer Academic Press, pp. 371–392 (1994b). This reference is incorporated by reference as if recited in full herein. This formulation provides invariance under the operations of translation and zoom (magnification) of the template, but relaxes the requirement for rotation invariance due to the angle-preserving term in the $\cos_{SS}$ function.

Automating the formation of and editing of the prior shape template

Figure 5:
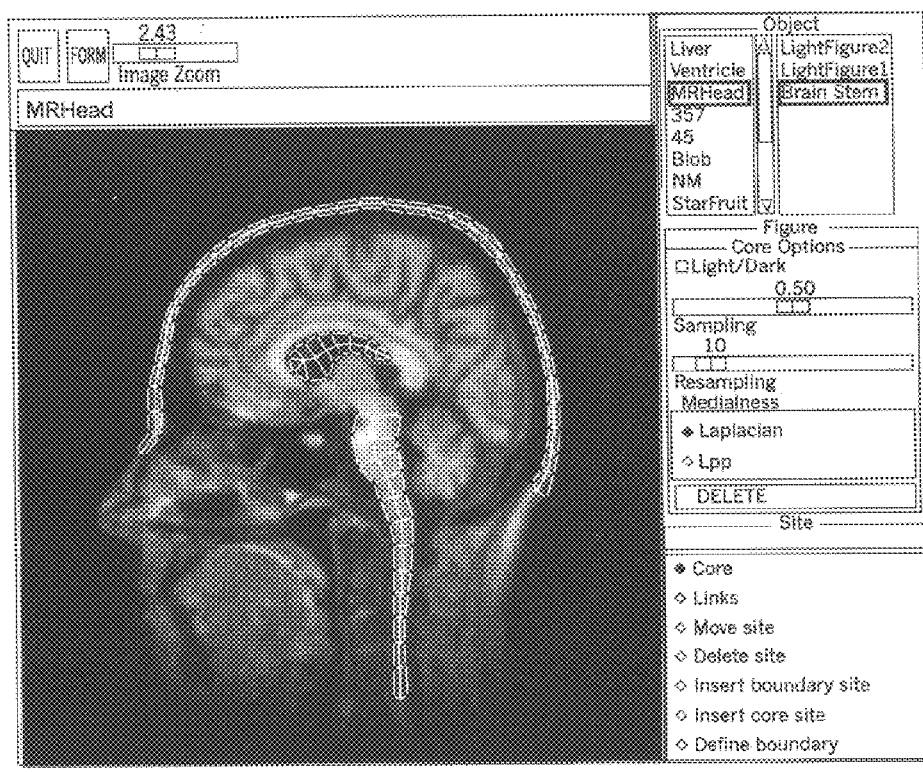
FIG. 5 illustrates an automated model generation program which allows user interaction with the program to insert, delete, and move desired sites and links.

In this section, a description on one way to use existing algorithms and programs for extraction of the medial loci (called cores) permits efficient construction of object shape templates on a training image (see FIG. 5). As described in Pizer et al. in *Zoom-invariant Vision of Figural Shape: The Mathematics of Cores,* UNC Computer Sci Tech Report, TRN 96-004 (1996), hereby incorporated by reference as if recited in full herein, core extraction can be initiated, under user control, by the selection of an approximate middle and width of an object in question. From such a "stimulus" point, a nearby point on track in scale space, that is the core, is first found, and then the core itself is tracked. Using such an approach, use of the instant invention in this way has been able to compute cores in a variety of imaging modalities and for a variety of objects in a few to tens of seconds, with the user having control of the end point positions.

Given a set of extracted cores, one for each of the figures which comprise the object in question, we have developed and implemented automated methods for extracting associated, approximate object boundaries. For each figural core, we compute the boundary at the scale of the core ("BASOC"), defined as the boundary of an object whose medial axis is the core. See Blum et al., *Shape Description Using Weighted Symmetric Axis Features*, 10 *Pattern Recognition*, pp. 167–180 (1978). This reference is hereby incorporated by reference as if recited in full herein. The BASOC, in many cases, closely conforms to the actual figural boundary, or at the very least yields a good starting locus from which we subsequently apply an active contours approach. See McAuliffe et al., Scale-space *Boundary Evolution Initialized by Cores*, Proceedings of the Fourth Intl Conf. On Visualization in BioMed. Computing, Hamburg, IEEE Computer Society Press, Los Alamitos, Calif. (1996). This reference is incorporated by reference as if recited in full herein.

To further automate the model building process, a figural core can first be coarsely sampled to yield the set of linked medial sites. A user-specified input to yield equidistant spatial sampling of the core can be used. Other means of sampling can also be used that take into account the shape of the figure as represented by the core (e.g., its width, curvature, etc.). The linked medial sites serve to establish a model for the global figural shape, and thus capture figural width and positional changes.

For each medial site, there exists a pair of opposing boundary points (called medial involutes) which lie on the BASOC and to which links are established to that medial site. These boundary points become the boundary sites in the model. To provide for zoom-invariance in both the model and in the likelihood function, each boundary site is preferably assigned a scale value (i.e., a Gaussian measurement aperture) proportional by a factor less than one to the scale of the medial site. These medial-to-boundary site links model the expected location of the boundary relative to the stable figure, and thus provide for stable boundary localization in the model fitting process.

Finally, the adjacent figural boundary sites are linked. These boundary-site links serve to establish a model for expected boundary shape. These connections also serve to define the coarsely sampled contour that will be used to produce the segmentation of a figure after posterior optimization.

At any point in the automated model building stage, the user may wish to edit the site configurations. To facilitate user interaction, one can employ a model editing tool which incorporates the automatic model generation discussed above and which allows for insertion, deletion, and movement of sites and links. The example models of structures in the brain in shown in FIG. 5 were generated in a few minutes using this type of tool. The model building tool can advantageously be configured to communicate directly with a relational database stored on a centralized server for convenient access, storage and management of model data.

The Likelihood Function: Capturing Image Information on Shape

Just as the measurement of shape change of the deformed template from the model template, producing the internal energy (prior), is intended to have built-in resistance to invariances to translation, rotation, and magnification, so should the image energy (likelihood) function, so that the segmentation can be unaffected by overall translations, rotations, and magnifications of objects in the image space. That is, for a given mapping of the model template to a given image, producing a posterior value, that posterior value should not change if the same transformation is applied to both the template and the image. Such measurement invariances can be obtained if (1) the measurement at a given site is based on a differential invariant (e.g., gradient magnitude), and (2) such a measurement is obtained with a Gaussian aperture that scales in size in proportion to object zoom. For detailed discussions of Gaussian scale space and differential invariants, see Pizer, supra; see also T. Lindeberg, *Scale-Space Theory in Computer Vision*, Kluwer Academic Publishers, Dordrecht (1994a); and Lindeberg et al., Ch. 1: *Linear scale space I, Basic Theory, and Ch. 2: Linear scale space II: Early Visual Operations*, Geometry-Driven Diffusion in Computer Vision, Kluwer Academic Publishers, Dordrecht, pp. 1–72(1994b). These references are incorporated by reference as if recited in fill herein.

In one construction of the likelihood function two types of features are used, boundaries and middles, each of which is measured using scale-space differential invariants (as described above). Preferably, the likelihood function is a weighted sum of boundariness measurements at the $N_b$ boundary sites, $(\vec{b}_i, \sigma_{bi})$ and the medialness measurements at the $N_m$ medial sites $(\vec{M}_i, \sigma_{mi})$:

$$\log \text{likelihood} = k_{bound} \sum_{i=1}^{N_b} B(\vec{b}_i, \sigma_{bi}) + k_{med} \sum_{i=1}^{N_m} M(\vec{m}_i, \sigma_{mi}), \quad \text{(Equation 7)}$$

where the weights, $k_{bound}$ and $k_{mea}$, on the boundariness and medialness values, $B(\vec{b}_i, \sigma_{bi})$ and $M(\vec{m}_i, \sigma_{mi})$, respectively, are to-be-determined hyperparameters.

Medialness at points on the medial locus

The medialness at a point and width is intended to accumulate boundariness contributions at a distance form the point equal to the width and in normal directions associated with rays emanating from the point. Magnification invariance requires that the scale of measurement of these boundariness contributions are proportional to the width; this leads to medialness values that are produced from boundariness measurements at a significant scale when the object has significant width. This large scale, together with the accumulation of multilocal boundariness contributions, has the property of producing a measurement that is much more stable against a variety of image disturbances than boundariness at the somewhat smaller scale at which it is typically measured. FIG. 13 illustrates this effect, which is proven at some length in Morse et al., *Zoom-Invariant Vision of Figural Shape: Effects on Cores of image Disturbances*, UNC Tech. Report, TR 96-005(1996), for a simple object in a noise-free image and in an image with a significant amount of additive noise. This reference is incorporated by reference as if recited in full herein. The effect is that an objective function optimization that includes medialness optimization stabilizes the computation as compared to deformable contours methods that only use boundariness information at a small, object-width-independent scale. In effect, performing optimization of the posterior in the model fitting process, the boundary locus localization is guided by the more stable medial locus localization. One preferred medialness function for use in the instant invention, which has been shown to work well in many image analysis tasks, is the maximum over orientation of the second derivative of the image at medial position $\overline{M}$ and scale $\sigma_m$.

$$M(\overline{m}, \sigma_m) = -\sigma_m^2 L_{\overline{pp+ee}} = -\sigma_m^2 \overline{+e,ovs\ p}^1 D^2 L\overline{p} = -\sigma_m^2 \lambda. \quad \text{(Equation 8)}$$

where L the scale-space representation of the original image, $$L(\overline{M}, \sigma m) = I(\overline{m}) \oplus G(\overline{m}, \sigma_m). \quad \text{(Equation 9)}$$

where G is a unit-normalized Gaussian kernel of standard deviation $\sigma_m$. In equation 8, $D^2L$ is the 2×2 matrix of second-order spatial derivatives of L. $D^2L\overline{P} = \lambda \overline{P}$, and $\lambda$ is the largest magnitude eigenvalue of $D^2L$. In essence, such a medialness operator will give an optimal response (with respect to nearby positions and scales) at the center of a bar at a scale proportional (by a factor of 1.0) to the width of the bar, with the orientation determined by the orientation of the long axis of the bar.

Boundariness at points on the boundary locus

Boundariness, at a much smaller scale than that typically used for medialness measurement is preferably used to guide each boundary point from its position relative to the medial locus in the model to the position which the image information indicates. This allows the boundary locus to reflect details while limiting its ability to deviate too much, relative to the figural width, from the location predicted by the model.

In a preferred embodiment of the boundariness measurements are computed at an image location $\overline{b}$ that is linked to a single medial point $\overline{m}$. The boundariness is computed at a scale $\sigma_b$ that is a fixed fraction of the scale $\sigma_m$ of the medial point to which it is linked. The boundariness $B(\overline{b}\sigma_b)$ is computed as a directional derivative of the image intensity in the direction of the link $\overline{u} = \overline{b} - \overline{m}$. That is, $$B(\overline{b}, \sigma_b) = \overline{u} \cdot \overline{\nabla L}(\overline{b}, \sigma_b) \quad \text{(Equation 10)}$$

where $\overline{u}$ is a unit vector and $\overline{\nabla L}(\overline{b}, \sigma_b)$ is the image space gradient of the intensity at position and $\overline{b}$ scale $\sigma_b$.

Optimizing the Posterior: Localization and Segmentation via Deformable Shape Loci This section describes the process whereby the model (the prior or internal energy component) is combined with the image information (the likelihood or image energy component) such that the deformation of the model template results in a segmentation of a modeled object in an unclassified image (a relative maximum in the posterior or objective function). Specifically, this section describes one way a method according to the instant invention can use large-scale, figural information captured by the medial locus to allow for the stable localization of the model in the image and for the subsequent local optimization of the posterior to allow for segmentation.

To summarize the discussion in the previous sections, to perform a segmentation it is preferred to optimize an objective function, the log posterior, that consists of an image energy term, the log likelihood, and a model or internal energy term, the log prior:

$$\text{log posterior} = \text{log likelihood} + \text{log prior} \quad \text{(Equation 11)}$$

$$= k_{bound} \sum_{i=1}^{N_b} B(\vec{b}_i, \sigma_{bi}) + k_{med} \sum_{i=1}^{N_m} M(\vec{m}_i, \sigma_{mi}) -$$

$$k_{internal} \left( \sum_{l_k \in MM\ links} \|l_k - l_k^{model}\|^2 + \sum_{l_k \in MB\ links} \|l_k - l_k^{model}\|^2 \right.$$

$$\left. + \sum_{l_k \in BB\ links} \|l_k - l_k^{model}\|^2 + \sum_{l_k \in FF\ links} \|l_k - l_k^{model}\|^2 \right),$$

where the hyper-parameters, $k_{bound}$, $k_{mod}$, and $k_{internal}$ can be estimated from training data obtained from human observers. See Wilson, 1996, supra.

Initialization of the shape template for object localization

Like most deformable contour methods, it is preferred that the model be initially positioned "close" to the object to be segmented in order to avoid convergence to an incorrect local maximum during the optimization process (e.g., a model for the kidney will not segment the desired object in a candidate image if it is initialized in the brain). To avoid such convergence problems in other deformable contour methods, which can occur with even modesdy poor initializations, several authors have chosen an implementation using coarse-to-fine schemes in which either the most "salient" features are first considered. See e.g. Radeva et al., *A Snake for Model-Based Segmentation*, 8 IEEE Trans. PAMI, pp. 816–821 (1995). Alternatively, others use multi-resolution images (pyramids) in a top-down fashion where the output at a lower resolution image is used as the input to the next highest-resolution image. Leymarie et al., *Tracking Deformable Objects in The Plane Using an Active Contour Model*, 15 IEEE Trans PAMI (1993).

Notably and advantageously, because we use a prior that reflects shape richly and explicitly recognizes figural width as an important descriptor of shape, the instant invention method has advantages, both computationally and theoretically, over other approaches. For example, the instant invention is able to perform initialization via saliency of figures, captured by the statistics of the object or figural hierarchy and via use of multiscale and multilocal information, in the form of the medial sites which carry with them figural width information.

Figures 7, 8:
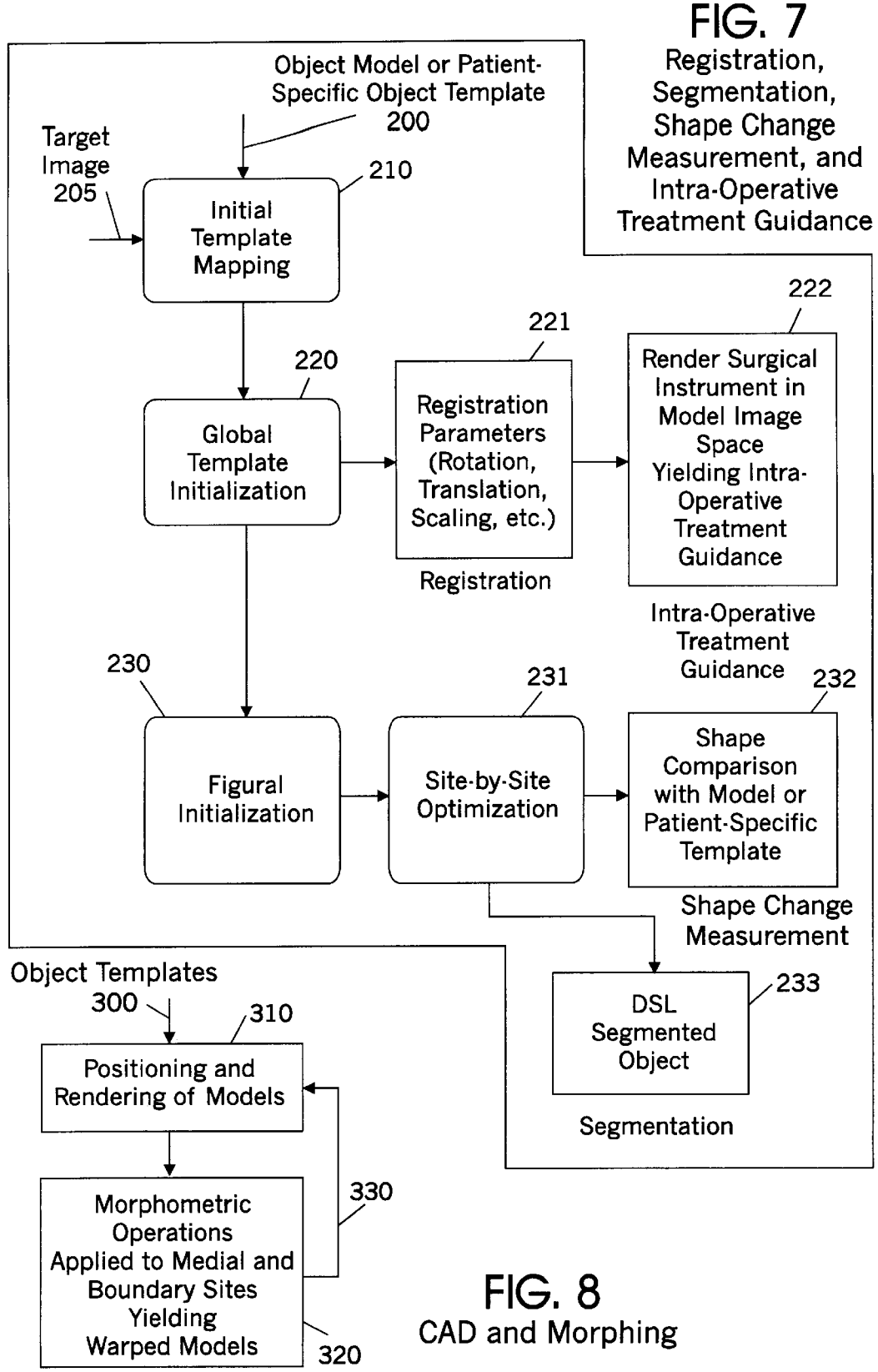
FIG. 7 is a flow diagram illustrating registration, segmentation, shape change measurement or intraoperative treatment guidance according to the present invention.
FIG. 8 is a flow diagram illustrating a morphomeric aspect of the present invention.

In a preferred embodiment, initialization of a model to a candidate image containing an object to be segmented occurs in three stages (FIG. 7, steps 210, 220, and 230). In the first stage, the model template is mapped to the image space of the candidate image. Next, a coarse registration of the training image and the candidate image can be performed to establish the approximate location of the object in question.

In the second stage, an optimization procedure is initiated which attempts to fit the collection of medial sites to their respective positions in the candidate image via maximization of the sum of the medialness in the candidate image at the template medial sites as a function of a global translation, rotation, and scaling applied to the template. This registration method is proposed and implemented by Fritsch et al., in *Core Based Portal Image Registration For Automatic Radiotherapy Treatment Verification*, 33(5) Int. Jnl. Radiat. Oncol. Biol. Phys., pp. 1287–1300 (1995); this reference is incorporated by reference as if recited in full herein. Due to the invariance properties built into the prior, such a process does not change the value of the prior (internal energy) from its mean. Due to the use of relatively large scale medial information, this stage is remarkably robust in the presence of small-scale image disturbances (e.g., boundary and/or intensity noise) and exhibits a region of convergence for translation on the order of the average scale (half-width) of the figures comprising the object.

In the third stage of initialization, each of the individual figures is allowed to deform rigidly (with magnification) in order to optimize the same functional as with global initialization. This step allows for any small adjustments in the position, orientation, and size of the figures relative to the global object shape. In the case where the figures comprising an object are linked, this stage can produce small changes in the prior term as figure-subfigure links (if present) are deformed from the mean. We have found that initialization, using an optimization strategy called simplex optimization takes on the order of a few seconds per figure. See generally Press et al., *Numerical Recipes in C: The Art of Scientific Computing,* Cambridge University Press, Cambridge (1995 2d ed.).

FIG. 14 illustrates an initialization procedure on an axial MR image of a brain ventricle. FIG. 14a shows a sample model for a ventricle consisting of two unlinked figures (for simplicity, no figural hierarchy nor cross-figural links have been defined). In FIGS. 14b–e, a warped image with the model template (shown in the form of the segments connecting the boundary sites) in various stages of initialization is shown. This image was generated by warping the image from which the model was generated (see below for a discussion of the warping procedure). In FIG. 14b, the model template is displayed in its initial configuration in the warped image. FIG. 14c shows the result for optimizing the integrated medialness in the warped image at all of the core sites in the model as a function of global rotation, translation, and scaling of the template. In FIGS. 14d and 14e, each of the individual figures have been initialized in the warped image using the same criterion of maximizing integrated medialness.

Optimization of the shape template for object segmentation

In a preferred embodiment, once an object is localized and the template is initialized, the template links are allowed to deform locally, via movement of the individual template sites, in order to optimize the objective function (the log of the posterior probability). Again, taking advantage of the stability properties of the relatively large-scale medial sites by first performing sequential, local optimization over all medial sites with associated boundary sites moving in concert so as to maintain the deformation energy (link difference) in the medial-boundary links at its post-initialization level. This allows the template links for each individual figure to deform based on the most stable features, the medial points, and thus to adjust to slight variations in figural shape from the prior mean.

Preferably, following this step, all of the template sites are allowed to move, in a sequential fashion, in an attempt to optimize the posterior probability. During this stage the boundary sites, which have been approximately aligned with the image features by the initialization process and by the previous step, move toward regions of high boundariness subject to the stabilizing constraints imposed by the prior links in the model. FIG. 14B shows a plot of the posterior probability versus iteration (over all sites) and the final configuration of the linked boundary sites after the last iteration. Typically, convergence toward a maximum in the posterior occurs in a number of iterations on the order of 10–20, and on an ordinary workstation the entire optimization process takes on the order of tens of seconds to several minutes (depending on the total number of sites in the model). Again, simplex optimization is used, as described above, to optimize each point as a function of its scale space position.

RESULTS

This section presents results of Monte Carlo studies undertaken to investigate the effectiveness of the segmentation method and to test its robustness in the presence of image disturbances. Also included are results demonstrating the applicability of this method to clinical MR and CT images, including a discussion of how object hierarchies may be used to facilitate object localization.

Monte Carlo Investigations

To test the effectiveness of the segmentation methods, a pair of pilot studies has been performed to examine the robustness of the method under increasing object deformation and under increasing levels of intensity noise. The methodologies and results of these studies are described below.

Deformation

To be clinically useful, a model-based segmentation method should be able to handle the normal variability seen in object shape across a population of patients. To test the robustness of the instant invention, in the presence of such variability, a simulated method was used which deformed, in a random way, a test object in an image having a defined a model template. In the procedure, the model image was warped on that image which displaces a set of fixed reference points by a random distance drawn from a uniform bivariate normal distribution with standard deviation $\sigma_{warp}$. Given the reference points and their respective randomly perturbed positions, Bookstein's thin-plate-spline warping algorithm was applied to produce a new image containing a warped version of the test object. F. Brookstein, *Principal Warps: Thin-plate splines and the decomposition of Deformations,* 11 IEEE Trans. Pattern Anal. and Machine Intell., 567–585(1989). This reference is incorporated as by reference as if recited in full herein. The same warping function is applied to the model template to generate "truth" in the warped images.

Following application of the initialization and posterior optimization method to each of the warped images (see FIG. 15 for representative examples), the final template is compared to the warped model to give a measure of segmentation quality. Preferably, the mean distance between the polygonalized model template and warped template boundary points is used as the error measure. Results of this study are shown in the plot in FIG. 19. Note that rather "large" warps still lead to subpixel mean errors. Moreover, the outliers with the higher errors for any level of warp have most of their error at figural ends, where measures of figural endness have not been used to attract the boundary.

Noise

Figure 19A:
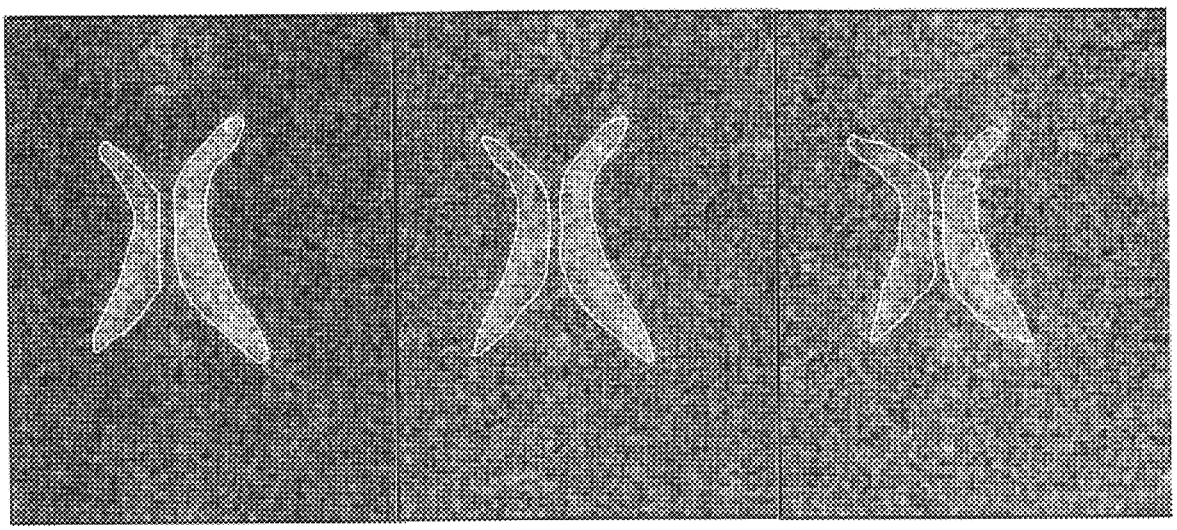
FIG. 19A is a pictorial illustration of a sample warped image from FIG. 19 using a sigma warp=8 as the unclassified test image with optimized boundaries for representative samples from Monte Carlo runs with signal to noise levels of approximately 6, 3, and 1.5.

The instant invention is able to robustly handle image disturbances because of the stabilizing effects of large-scale, medial measurements. To illustrate this robustness, the above described experiment was repeated using increasing amounts of additive, Guassian-distributed white noise. In this study, a sample warped image near the mean in the middle group in FIG. 19 (with $\sigma_{warp}$=8) was used as the unclassified test image. Shown in FIG. 19A are the final optimized boundaries for representative samples from the Monte Carlo runs with signal-to-noise levels of approximately 6, 3, and 1.5.

Figure 19B:
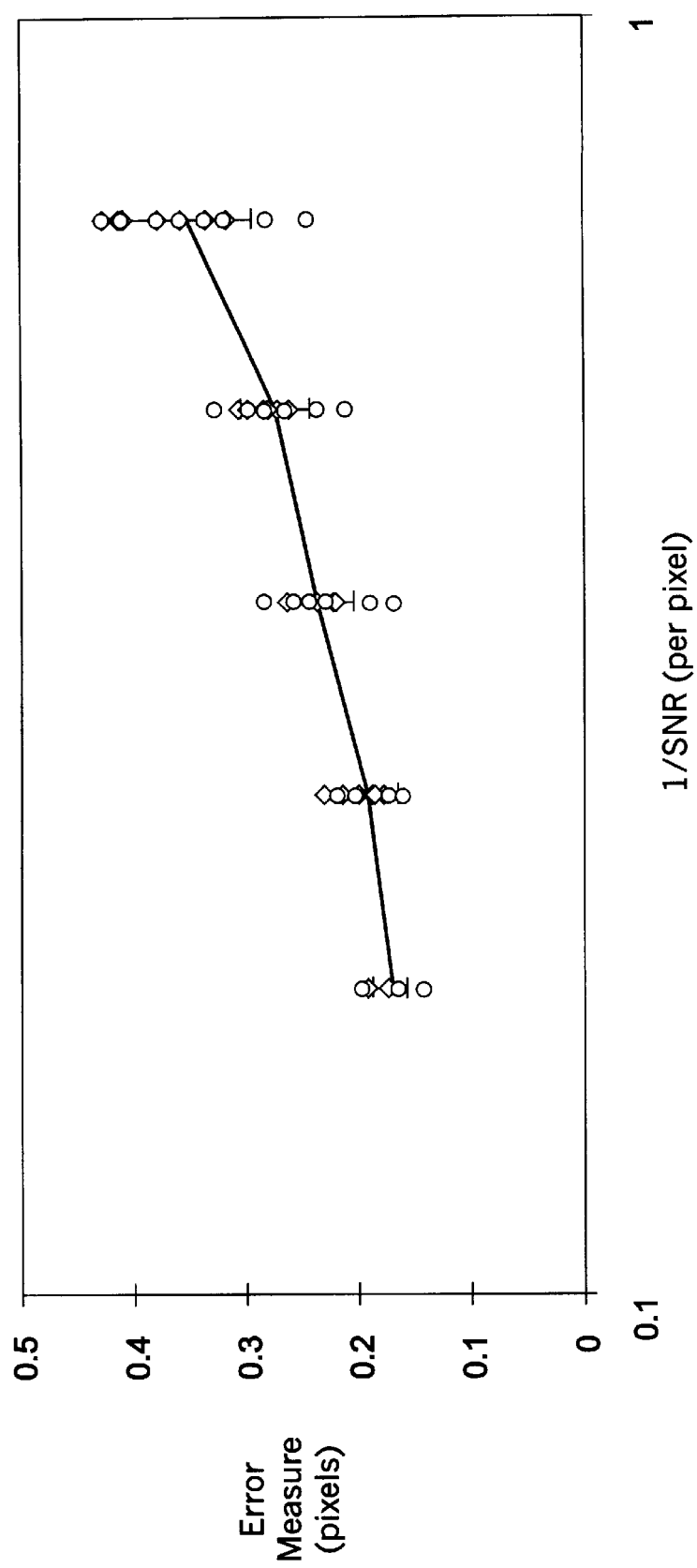
FIG. 19B is a graphical illustration of the results of segmentation and increasing levels of noise, which shows that even with noise levels much greater than one would expect to find in clinical images, the method of the present invention is able to yield segmentations of the ventricle with only sub-pixel (less than 1 db)errors.

The plot of the results in FIG. 19B shows that even with noise levels much greater than one would expect to find in clinical images, the method is able to yield segmentations of the ventricle with sub-pixel errors.

Use of a Model with Inter-Figural Links on Clinically-Variable Ventricles

A simple, two-figure model of the ventricle used to produce the results in the preceding section made no use of inter-figural links. Hence, except during the global initialization stage, each of the figures was allowed to deform independently during the optimization process. As described above, the use of models that include such inter-figural links, take advantage of figural hierarchies wherein the most "stable" figures are used to establish the approximate location of subfigures.

FIG. 16 shows a five-figure model 35 for a ventricle superimposed on its training image. The model template 35, generated using the model building tool described above, represents the ventricle by a parent figure comprised of a linked medial and boundary locus running down the relatively large-scale central portion, and by four subfigures with linked medial and boundary loci corresponding to each of the horns of the ventricle. In addition, a set of inter-figural links is defined which connect neighboring boundary sites on the subfigures and the parent figure.

This model was applied to a series of axial MR images, taken at approximately the same slice depth in the head, from a population of patients using a hierarchical localization scheme. First, the template sites for only the parent FIG. 36 were matched to the images in order to optimize the sum of the boundariness and medialness at these sites as a function of global translation, rotation, and scaling. Following this initial mapping, each of the subfigures 37A, 37B, 37C, 37D was placed relative to the parent figure such that the inter-figural link differences were zero, and each of the sites for the subfigures were then optimized over the individual figural parameters of translation, rotation, and scaling. Finally, sequential optimization over all template sites was performed to yield the results shown in FIG. 17.

Figure 17:
FIG. 17 illustrates the final "optimization" position of deformed template sites on ventricles taken from a population of patient images employing the model template shown in FIG. 16.

Such a hierarchical approach provides of more flexible location, as each of the subfigures is allowed to adjust for slight differences in size, position, and orientation relative to the larger scale, more stable parent figure. As FIG. 17 illustrates, a model generated from a single training image is capable of yielding segmentations of objects with a variety of subtle shape differences. Experience has shown that removal of the medial sites results in very few successful segmentations, as the medial sites are needed to help guide the boundary sites to their approximate locations in the initialization stage and provide stability during the local optimization stage.

External Models

Figure 18:
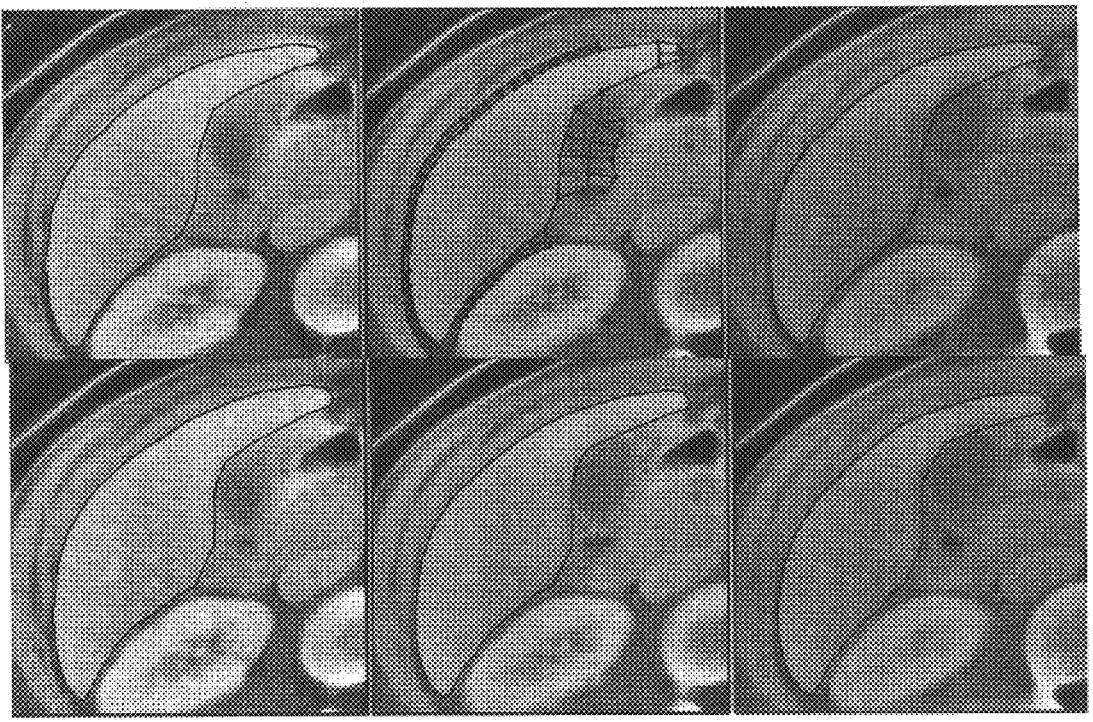

While the ventricle examples shown thus far have made use of only the figural information in the object (internal medial sites), external structures can also be employed to define models. This includes such external items as indentations, neighboring objects, and the spaces between objects. When gaps between the anatomical object to be segmented and a neighboring object are narrow, the use of the gaps to guide the segmentation by the correspondingly narrow medialness apertures can avoid problems of inter-object interference. A recent example of such an approach applied to a liver in an axial CT slice through the abdomen is demonstrated in FIG. 18. In this study, an external model was generated, using the interactive model building tool, on a characteristic slice. The model consists of 4 FIGS. corresponding roughly to the gap between the liver and the chest wall, the gap between the liver and the kidney, the anterior tip of the liver (the only internal structures used), and a structure identified as the gall bladder. A boundary was defined by choosing a set of connections between certain boundary sites in the model and is shown superimposed on the adjacent CT slices from the same scan, above and below the model slice, in the left and right image in the top row of FIG. 18. The optimization process was applied to the full model on all slices and the resulting boundary is shown for each of the three images in the bottom row of FIG. 18.

Use of an Object Hierarchy

Figure 9:
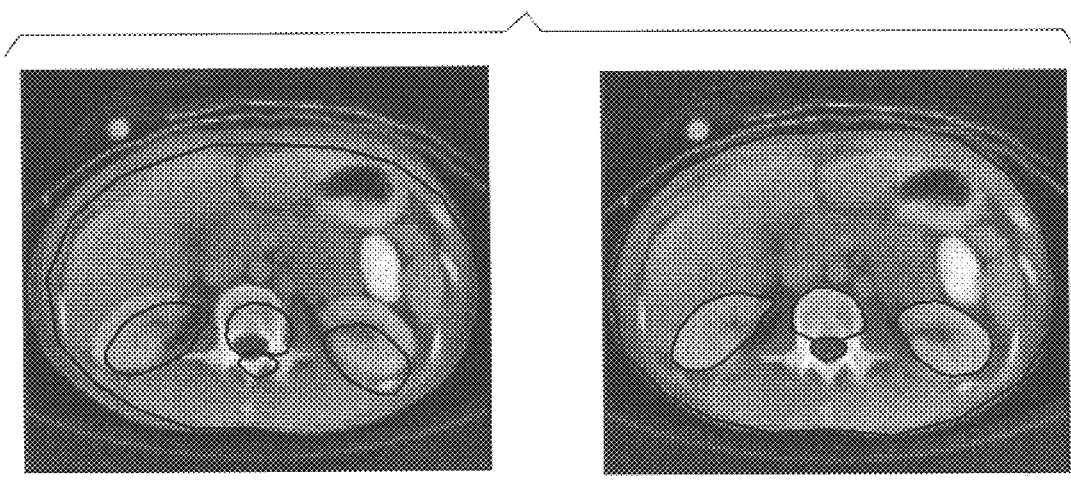
FIG. 9 is a pictorial illustration of original and final template configurations to identify organs in an axial CT slice through the abdomen.
Figure 11:
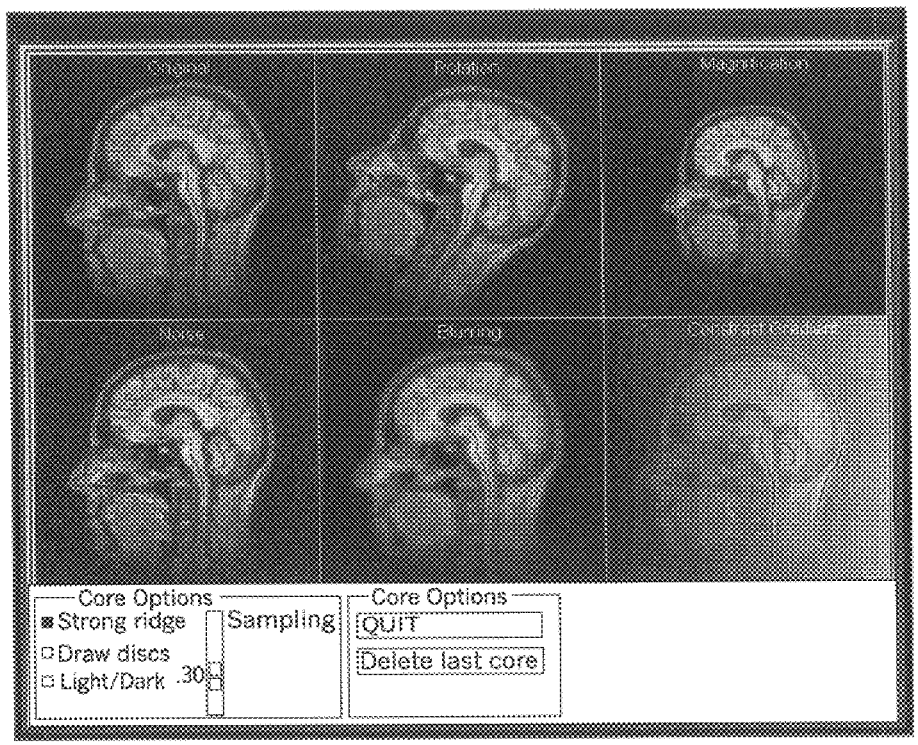
FIG. 11 is a pictorial representation of the head which illustrates stimulated cores from a magnetic resonance image and shows the invariance properties and the insensitivities of the cores to image noise, blurring, and object contrast according to the present invention.

As a final example, an additional application of a DSL approach utilizes multiple objects organized in an object hierarchy. Similar to the use of figural hierarchies (for multi-figure objects), where subfigures are located relative to more stable parent figures, this approach seeks to utilize the most stable objects to establish the relative location of other objects. In this example, a model was constructed on an axial CT slice through the abdomen on five objects: the entire abdomen cross section, each of the kidneys, the vertebra, and the spinal cord where the linked boundary loci are shown in FIG. 9. Using the strategy outlined below, the hierarchy of object models was fit to another slice (from the same CT scan) approximately 1.6 cm away from the model slice.

Because the model of the abdomen contains the largest-scale information in its medial sites, and hence is little-affected by the presence of smaller-scale information in the image, the localization approach is first applied to the template points in only the abdomen template. The shift, rotation, and scaling needed to match the abdomen template is then applied to al of the models such that the initial position of each of the sub-objects (kidneys, vertebra, and spinal cord) is defined relative to the abdomen. Next, the localization process is applied to all of the sites in the kidneys, vertebra, and spinal cord and they move as a collection to optimize the image energy as a function of their overall position, orientation, and scaling. This establishes the approximate location of the group of sub-objects. Finally, the localization process is applied to each of the individual sub-objects, after which the local optimization process commences. In the current implementation, no inter-object links have been defined which could potentially constrain the shape of a sub-object conditional upon the shape and position of a parent object.

The present invention will now be described with respect to FIGS. 6, 7, and 8 which are flowcharts illustrating the operation of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions.

Figure 6:
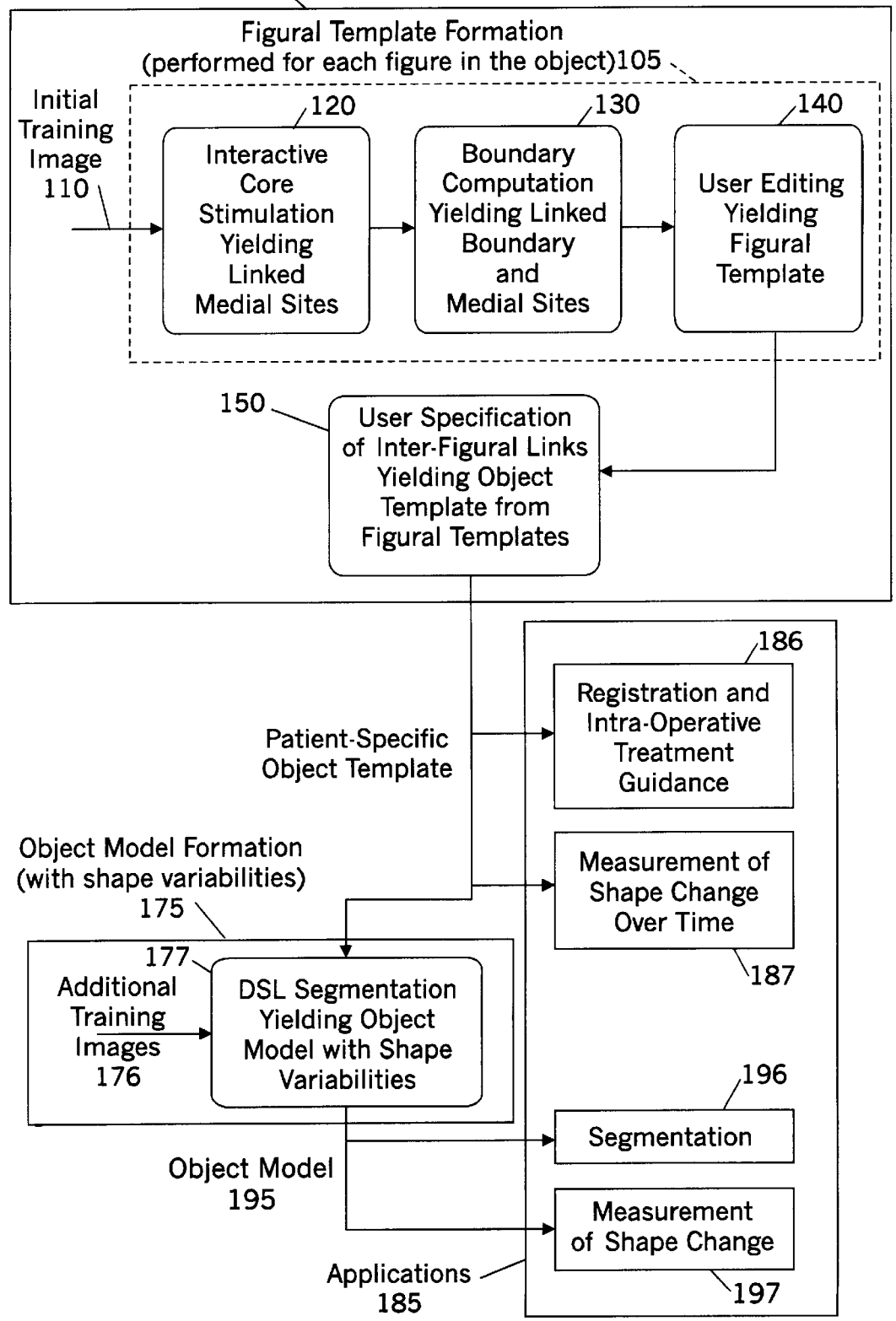
FIG. 6 is a flow diagram illustrating figural or object template formation according to the present invention.

Turning now to FIG. 6, a preferred method for object recognition according to the instant invention is shown. In order to generate or form an object template, as illustrated in FIG. 6 at block 110, an initial training image of a predetermined object is generated in computer readable format, i.e., a digital image. Next, for each figure (or subfigure in the model or template), the core or central portion of the object figure is identified by the computer and an interactive core stimulation is performed yielding linked medial sites (MM links) (block 120). Similarly, at block 130, boundary sites for each medial site are computed along with the associated medial to boundary (MB) links. Preferably, as shown at block 140, a user can interactively edit via input to the computer displayed image, the desired core shape. As further explained by FIG. 5, additional editing tools can facilitate a user's input. Blocks 110, 120, 130, and 140 form the Figural template 105. As shown by block 150, a user can specify or indicate any inter-figural (FF) links desired in the object template. Block 150 together with the figural template formation steps define the object template formation 100.

This object template 100 can be used with various applications 185. For example, it can be used in patient specific object templates, wherein the template is generated from an image of the patient. Thus, the template is used for registration and intra-operative treatment guidance procedures 186, such as displaying and identifying anatomical paths to assist surgical routing during a surgical procedure. Another application is to compare a second patient image with the first to measure shape change over time, 187. This can track disease progression in a patient, such as schizophrenia, and the like.

Alternatively, as shown at block 176, additional training images 176 can be generated and, shown by block 177, deformable shape loci ("DSL") segmentation can be preformed on the training images by comparing to the object template. This will yield an object model with shape variabilities 175. This object model 175 can be applied to segment, block 196, and or measure shape variation or change, block 197 in a target image.

Turning now to FIG. 7, in preferred embodiments, an object model or patient specific object template can be applied to a target image 205. An initial template mapping of the target image is performed, block 210. As discussed above, the initial mapping is preferably done on the core or primary stable figure. This will help identify the location of the desired target object within the image. Once the initial mapping is performed, a global template initialization is performed, block 220, roughly matching the inter-figural components as well as the contour and the core. At this stage, the global template can be further matched to a figural initialization (block 230) or to register certain parameters (block 221) to detect rotation translation, scaling etc... After registration, the object can be used to render surgical instruments in the model image object space, yielding intra-operative treatment guidance and visual assistance. If figural initialization is applicable, then site by site optimization can proceed (block 231) and the object can be DSL segmented 233 or the object parameters can be used to determine or compare shape change (block 232).

Yet another application for the present invention is illustrated in FIG. 8. Object templates 300 can be used to position and display models of desired figures or shapes (block 310). A morphometric operation can be applied to medial and boundary sites to yield warped models, and intermediate positions can be stimulated by the change between the initial and end position of the object. These operations can be repeated to generate a sequence of planned position shapes (block 330).

This method can be used to synthesize objects in computer graphics. The representation of an object shape is produced by establishing a figural shape hierarchy recognition pattern based on the shape of a target object having a plurality of subfigures therein. A medial axis can be defined along a dimension of the target figure as discussed above. The medial sites are used to generate a plurality of medial to medial ("MM") link segments defined by adjacent medial sites and an object template can be generated based on the medial sites, and the MM link segments and preferably the MB and BB segments. As such, objects can be designed using a successively developed figural hierarchy, defined by successive decrease of spacing of sites in each figure's representation. The points are computed on a boundary contour relative to the linked medial sites, and the contour can be interpolated based on these computed boundary points with each figure in this hierarchy associated with an image to be rendered and graphically displayed. The object is then morphed from a first beginning position to a second end position by interpolation of the medial sites in the figures held in common between the beginning and end positions of the object being morphed.

Preferably, the synthesizing method is used to physically model successively higher resolution images based on the hierarchical approach of step such that morphed objects are displayed at successively higher resolution based on the hierarchical approach. As is well known to those of skill in the art, in order to properly render the object, one must do so in a manner in which a viewer will see the image on the display screen. This is typically accomplished by projecting the object in a plane which is orthogonal to a viewer's line of vision, a ray that passes from the pupil of a viewer to a point on the monitor. Stated differently, the object representation template is displayed on a 3D display so as to render a depiction of an object such that the surface contour further uses the intersection of view rays through each screen pixel which locates a boundary point along a line generated by an imaging beam orthogonal to the surface at each point.

It will be appreciated that the object recognition method of the present invention, although describing a preferred method and sequence can performed in alternative ways and still be within the scope of the instant invention.

In a preferred embodiment, the object recognition is employed in medical image registration to detect, measure, and preferably correct treatment set-up errors. In another preferred embodiment, the instant invention is used to correlate images from different imaging modalities or in the same modality, but images spaced-apart over time, which can help monitor changes in shape and or size of specified targets which, in turn, can help monitor the progress of a disease or treatment over time. However, the present invention can also be used to identify and measure changes in other standard figures. For example, building structures such as I-beams can be monitored for deformation which can indicate undesirable loading or stress. Alternatively, a particular figure in a digital image can be modeled and a computer can automatically compare future images to determine is such a figure is found therein.

In summary, the instant invention describes a method which takes a deformable loci approach to segmentation but uses a prior richly describing shape in terms of both figural and boundary aspects, and an image energy that stabilizes by its use of medialness that has a scale significant relative to figural width and yet sensitively locates the boundary using smaller-scale measurement of boundariness. The model is preferably formed through a user's appreciation of what are the stable figures of the shape of a target object, so the model formation involves interaction, aided by core-extracting methods. On the other hand, the segmentation of the object for a new patient is intended to be fully automatic in most cases. The method, as initially programmed, requires only from several seconds to a few minutes to segment a multi figure object on an ordinary workstation. The fact that for N boundary sites there are only O(N) model sites and only O(N) links means that the method only requires O(N) time. When applied to relatively high contrast objects such as the ventricle in MR brain images, the method has been shown to produce subpixel accuracy in the presence of deformations of the model and large amounts of intensity noise. It has also been shown able to follow quite a range of normal clinical variation in ventricle shape.

The foregoing is illustrative of the present invention and is not to be construed as limiting thereof Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The foregoing is illustrative of the present invention and is not to be construed as limiting thereof. The invention is defined by the following claims, with equivalents of the claims to be included therein.

That which is claimed is:

1. A method for producing a representation of object shape by establishing a shape hierarchy recognition pattern based on the shape of an object in a digital reference, comprising the steps of:
    (a) defining a medial axis along a dimension of the object, the medial axis having a plurality of medial sites there along;
    (b) generating a plurality of medial to medial ("MM") link segments defined by adjacent medial sites;
    (c) generating opposing first and second boundary sites for each of said medial sites, wherein said first and second boundary sites are separated by said medial axis;
    (d) generating a plurality of medial to boundary ("MB") link segments each MB segment defined by a respective one of said first and second boundary sites and a corresponding one of said medial sites;
    (e) generating a plurality of boundary to boundary ("BB") link segments defined by adjacent boundary sites; and
    (f) generating an object shape template for the object based on said medial sites, said boundary sites, said MM links, said MB links, and said BB links.

2. A method according to claim 1, wherein said object includes a parent figure and at least one subfigure, and said template represents the parent figure and the subfigure, said method further comprising the step of:
    (g) generating at least one figure to figure ("FF") link segment corresponding to each identified subfigure, said FF link being connected to a selected site of the parent figure.

3. A method according to claim 1, further comprising the step of determining a width component associated with variation of width of the object along said medial axis.

4. A method according to claim 3, wherein a user inputs selected core information to the computer and the medial axis and the associated width components are automatically generated by a computer.

5. A method according to claim 4, wherein said width is determined by optimizing medialness and determining local boundariness measurements.

6. A method according to claim 4, wherein said automatic generation of the medial axis and associated width components determine corresponding boundary sites.

7. A method according to claim 1, further comprising the step of accepting user input for generating said target shape.

8. A method according to claim 2, further comprising the step of accepting user input to establish the figure to figure link segments.

9. A method according to claim 2, wherein the object shape template is a model template from a reference image, the method further comprising the step of (h) measuring the correspondence of the model template to a second digital image (the target image) having at least one object (the target object) therein.

10. A method according to claim 9, further comprising the steps of:
    (i) calculating a medialness value corresponding to a medial site wherein the medialness value corresponds to the value used to determine the correspondence of both position and width at the medial site with data associated with the target image; and
    (ii) calculating a boundariness value corresponding to a boundary site, using a scale proportional to the scale of the linked medial site wherein the boundariness value is used to determine the correspondence of the position at the boundary site with the target image data.

11. A method according to claim 9, further comprising the step of deforming said model template to match the shape of the target object and analyzing the deformed model template with the model template.

12. A method according to claim 11, wherein said analyzing step comprises extracting a sum of medialness and boundariness measurements corresponding to sites in the representation of the object in the target image.

13. A method according to claim 10, the method further comprises the steps of: deforming the model template to match the object in the target image; measuring agreement of the deformed template with an object in the target image; and analyzing the difference in the model links in the deformed template with those of the model template to recognize and segment the target object in the target image.

14. A method according to claim 13, wherein said analyzing step includes the step of generating a penalty value, wherein the penalty value corresponds to a measure of deformation of the deformed template, such that the greater the deformation, the higher the penalty value.

15. A method according to claim 13, further comprising the step of analyzing in predetermined order selected subsets of said sites to optimize the objective function.

16. A method according to claim 9, further comprising the steps of: identifying an object represented by the model template; extracting the identified object from a target image; and refining the boundary interpolated through the boundary sites of the identified object.

17. A method according to claim 11, wherein at least two images are registered based on said object template generated from a reference image and its geometric transformation into the target image.

18. A method according to claim 11, wherein points are computed on a boundary contour defined by said linked boundary sites, and wherein said contour is interpolated based on these computed boundary points.

19. A method according to claim 18, further comprising the steps of displaying the object representation template on a 3D display so as to render a depiction of an object, wherein the surface contour further uses the intersection of view rays through each screen pixel which locates a boundary point along a line generated by an imaging beam orthogonal to the surface at each point.

20. A method according to claim 13, further comprising the step of extracting measures of shape, shape anomaly, and shape sequence anomaly according to changes in orientation, length, and width of said links.

21. A method for synthesizing objects in computer graphics by producing a representation of an object shape by establishing a figural shape hierarchy recognition pattern based on the shape of a target object having a plurality of subfigures therein, comprising the steps of:

(a) defining a medial axis along a dimension of a target figure, the medial axis having a plurality of medial sites there along;

(b) generating a plurality of medial to medial ("MM") link segments defined by adjacent medial sites;

(c) generating an object template based on said medial sites, and said MM link segments;

(d) designing objects, using a successively developed figural hierarchy, defined by successive decrease of spacing of sites in each figure's representation, wherein points are computed on a boundary contour relative to said linked medial sites, and wherein said contour is interpolated based on these computed boundary points with each figure in this hierarchy associated with an image to be rendered and graphically displayed; and (e) morphing said object from a first beginning position to a second end position by interpolation of said medial sites in the figures held in common between the beginning and end positions of the object being morphed.

22. A method according to claim 21, wherein said synthesizing method is used to physically model successively higher resolution images based on the hierarchical approach of step (d) and wherein said morphed objects are displayed at successively higher resolution based on the hierarchical approach of step (d).

23. A method for automatic registration or segmentation of anatomical features for radiation therapy or diagnostic evaluation, comprising the steps of:

generating a first digital image of a predetermined anatomical region of the body;

defining a model template of a desired object within said first image using scale-space relationships, said model template including a skeletal grid defining relational deformable shape loci and links, including a medial axis, a contour boundary shape, MM links, MB links, and BB links;

generating an unclassified target digital image of a desired region in a patient's body;

applying said model template to said unclassified image to automatically find the corresponding object in said unclassified target image;

allowing said template deformable shape loci and links to deform to match the contour and core of said corresponding object in said unclassified target image;

determining relational measurements associated with said model template and said target object shape; and correlating measurements associated with said model template and said target object to determine at least one of registration and segmentation of said target image.

24. A method according to claim 23, wherein said defining step accepts user input to define the object of interest in the training image.

25. A method according to claim 23, wherein poor correlation between said target object shape and said template indicates a set-up error.

26. A method according to claim 23, wherein said first image and said target image are generated from the same patient.

27. A method according to claim 20, wherein variation of said target image object relative to said first image object generates a poor correlation value which corresponds to progression of a disease.

28. A method according to claim 23, wherein said first image and said unclassified image are both portal images, and wherein registration between the two quantitatively indicates field positioning errors.

29. A computer program product for object recognition employing a deformable loci skeletal grid representation pattern, said computer program product comprising:

computer usable medium having computer readable program code means embodied in said medium, said computer-readable program code means comprising:

computer readable program code means for causing said computer to generate a skeletal grid shape representation pattern corresponding to a preselected object, said grid including a plurality of medial sites, a plurality of boundary sites, a plurality of medial to medial links joining adjacent medial sites, a plurality of medial to boundary links joining a selected medial site with a corresponding boundary site, and a plurality of boundary to boundary links joining adjacent boundary sites; and computer readable program code means for allowing said links in said grid to be deformed for subsequent matching to a similarly shaped object.

30. A computer program product for object representation according to claim 29, wherein said computer readable program code means further includes computer readable program code means for causing said computer to represent subfigural objects within said object and relationally link said represented subfigural objects to said skeletal grid.

31. A system for generating a representation of object shape by establishing a shape hierarchy recognition pattern based on the shape of a target object in a digital reference, comprising:

means for defining a medial axis along a dimension of a target figure, the medial axis having a plurality of medial sites there along;

means for generating a plurality of medial to medial ("MM") link segments defined by adjacent medial sites;

means for generating opposing first and second boundary sites for each of said medial sites, wherein said first and second boundary sites are separated by said medial axis;

means for generating a plurality of medial to boundary ("MB") link segments each MB segment defined by a respective one of said first and second boundary sites and a corresponding one of said medial sites;

means for generating a plurality of boundary to boundary ("BB") link segments defined by adjacent boundary sites; and means for generating an object template based on said medial sites, said boundary sites, said MM links, said MB links, and said BB links.

* * * * *